US006328155B1

(12) United States Patent
Omura et al.

(10) Patent No.: US 6,328,155 B1
(45) Date of Patent: Dec. 11, 2001

(54) TRANSFER BELT UNIT

(75) Inventors: Ken Omura, Yokohama; Yoshitsugu Nakatomi, Yokosuka; Tsuyoshi Todome, Kawasaki; Koichi Hiruta, Miura, all of (JP)

(73) Assignees: Toshiba Tec Kabushiki Kaisha, Tokyo; Kabushiki Kaisha Toshiba, Kawasaki, both of (JP)

( * ) Notice: Subject to any disclaimer, the term of this patent is extended or adjusted under 35 U.S.C. 154(b) by 0 days.

(21) Appl. No.: 09/456,555

(22) Filed: Dec. 8, 1999

(30) Foreign Application Priority Data

Dec. 8, 1998 (JP) ........................................ 10-349173

(51) Int. Cl.[7] ........................................ B65G 23/44

(52) U.S. Cl. ........................ 198/813; 198/813; 198/814; 198/832

(58) Field of Search ........................ 198/813, 814, 198/832; 271/306

(56) References Cited

U.S. PATENT DOCUMENTS

| | | | | |
|---|---|---|---|---|
| 4,270,906 | * | 6/1981 | Kraft et al. | 474/135 |
| 5,054,769 | * | 10/1991 | Watashi | 271/306 |
| 5,482,266 | * | 1/1996 | Takemoto et al. | 271/272 |
| 5,632,372 | * | 5/1997 | Steinbuchel, IV et al | 198/813 |
| 5,669,054 | | 9/1997 | Uchida et al. | 399/313 |
| 5,787,326 | | 7/1998 | Ogawa et al. | 399/124 |
| 5,941,263 | * | 9/1999 | Uber et al. | 198/813 |
| 6,073,755 | * | 6/2000 | Hillard et al. | 196/813 |
| 6,161,683 | * | 12/1998 | Wallis | 198/816 |

FOREIGN PATENT DOCUMENTS

| | | |
|---|---|---|
| 8-272229 | 10/1996 | (JP) . |
| 9-236993 | 9/1997 | (JP) . |
| 10-39651 | 2/1998 | (JP) . |
| 10-187002 | 7/1998 | (JP) . |

* cited by examiner

*Primary Examiner*—Christopher P. Ellis
*Assistant Examiner*—Rashmi Sharma
(74) *Attorney, Agent, or Firm*—Foley & Lardner

(57) ABSTRACT

An image forming apparatus is provided with a table unit which can be taken out to a front side in a state of opening a front cover of a main body. A transfer belt unit integrally constituted by a transfer belt, a drive roller, a driven roller, a transfer roller and the like is detachably set on the table unit. In the case of setting the transfer belt unit to the apparatus main body, the transfer belt unit is set on the table unit, the table unit is inserted into the apparatus main body, and the transfer belt unit is lifted up by rotating a handle so as to be brought into contact with the process unit. Accordingly, it is possible to easily attach and detach the transfer belt unit with respect to the apparatus main body, thereby simplifying a replacing operation.

4 Claims, 20 Drawing Sheets

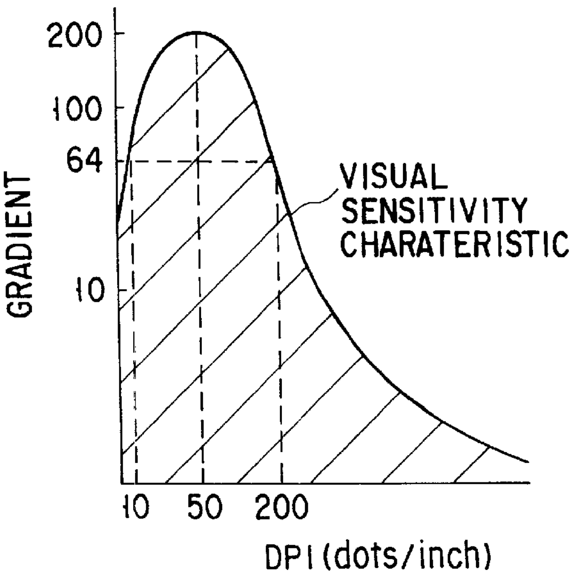
FIG. 14
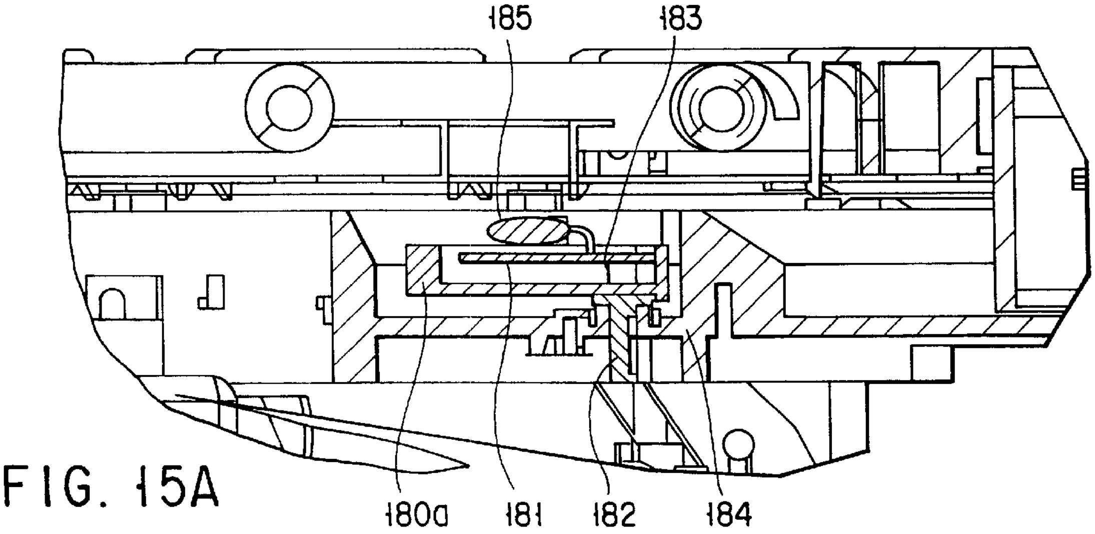
FIG. 15A
FIG. 15B
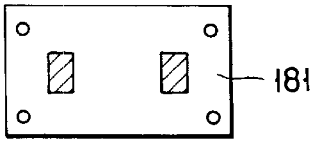

TRANSFER BELT UNIT

BACKGROUND OF THE INVENTION

The present invention relates to a transfer belt unit which is mounted on a full color copying machine, a color printer and the like.

An image forming apparatus such as a full color copying machine, a color printer or the like has a process unit provided with four image forming portions (yellow, magenta, cyan and black) for forming the respective color images in parallel, and a transfer belt for conveying a paper through these four image forming portions. The transfer belt is tensioned around a pair of rollers which are arranged apart from each other, arranged below the process unit and rolls in contact with a photosensitive drum in each of the image forming portions.

Further, four transfer rollers are arranged in an inner side of the transfer belt in a positional relationship opposing to each of the photosensitive drum. Each of the transfer rollers functions so as to apply a high bias voltage from the inner side of the transfer belt, supply a high voltage to a paper adhered and held on the transfer belt in an electrostatic manner and conveyed, and transfer a toner image with each of the colors formed on a surface of the photosensitive drum on the paper in an overlapping manner.

In general, a drive roller and a driven roller around which the transfer belt is wound are rotatably mounted to a frame of the image forming apparatus. That is, the transfer belt is assembled in the image forming apparatus in a fixed manner. Further, a power supply portion for supplying a high voltage from a side of an apparatus main body is connected to each of the transfer rollers.

Accordingly, at a time of replacing the transfer belt or the transfer roller due to a service life, at first the process unit including four image forming portions is taken out from the image forming apparatus by a service operator. Thereafter, the transfer belt is taken out from the apparatus, a connection between the transfer roller and the power supply portion is cancelled so as to take out the transfer roller from the apparatus, and a new transfer belt and a new transfer roller are mounted to the apparatus.

Further, in this kind of image forming apparatus, in the case that a jamming of the paper is generated between the process unit and the transfer belt, the process unit is taken out from the apparatus or the process unit is slightly tilted and moved apart from the transfer belt so as to form a slight space between the transfer belt and the process unit, thereby removing the paper.

However, in the conventional image forming apparatus mentioned above, in the case of replacing the transfer belt and the transfer roller by the new ones, it is necessary to take out the transfer belt from the apparatus and take out the connection between each of the power supply portions of the transfer rollers so as to take out the transfer rollers from the apparatus after temporarily taking out the process unit from the apparatus, so that there is a problem that it is troublesome to replace the transfer belt and the transfer rollers. Accordingly, the user can not replace the transfer belt and the transfer rollers and the replacing operation requires much load for the service operator. Further, as mentioned above, since much time is required for replacing the transfer belt and the transfer rollers, there is a problem that a time for which the apparatus is stopped for the replacing operation is increased, so that the rate of operation of the apparatus is reduced.

Further, in the conventional image forming apparatus mentioned above, in the case of treating the jamming of the paper clogged between the process unit and the transfer belt, in the apparatus of a type which is rotated upward around one end of the process unit so as to be tilted, it is impossible to sufficiently secure a treating space in the upstream side or the downstream side of the transfer belt, so that it is troublesome to remove the paper.

BRIEF SUMMARY OF THE INVENTION

The present invention is made by taking the points mentioned above into consideration, and an object thereof is to provide a transfer belt unit which can easily attach and detach a transfer belt with respect to a main body of an image forming apparatus.

In order to achieve the object mentioned above, according to the present invention, there is provided a transfer belt unit including:

a first roller to which a driving force is transmitted under a state of being mounted within a main body of an image forming apparatus from a side of the main body;

a second roller arranged apart from the first roller;

a transfer belt wound around the first and second rollers and tensioned so as to run in an endless manner;

the first and second rollers and the transfer belt forming a unit and structured so as to be attached to and detached from the main body.

According to the invention mentioned above, since the first roller, the second roller and the transfer belt are made the unit and structured so as to be attached to and detached from the main body of the image forming apparatus, it is possible to easily replace the transfer belt due to a service life.

Further, according to the present invention, there is provided a transfer belt unit detachably mounted to an image forming apparatus for forming an image on a medium via a plurality of image forming portions, including:

a first roller to which a driving force is transmitted under a state of mounting the transfer belt unit to a main body of the image forming apparatus from a side of the main body;

a second roller arranged apart from the first roller;

a transfer belt wound around the first and second rollers and tensioned so as to run in an endless manner, holding the medium and conveying the medium through the plurality of image forming portions;

a plurality of transfer rollers arranged inside the transfer belt in correspondence to the plurality of image forming portions;

the first and second rollers, the transfer belt and the plurality of transfer rollers being integrally formed.

Further, according to the present invention, there is provided a detachable mechanism for a transfer belt unit which is provided in a side of a main body of an image forming apparatus for detachably mounting the transfer belt unit to a predetermined position within the main body, the transfer belt unit integrally having first and second rollers apart from each other, a transfer belt wound around the first and second rollers and tensioned so as to run in an endless manner, a transfer roller provided inside the transfer belt and a pair of frames rotatably supporting both ends of the first and second rollers;

the detachable mechanism comprising:

a drive mechanism connected to the first roller when mounting the transfer belt unit within the main body so as to rotate the first roller; and a lift-up mechanism for lifting up the pair of frames of the transfer belt unit inserted into the main body and connected to the drive mechanism so as to set the transfer belt unit to the predetermined position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 14 is a graph for explaining a visual sensitivity characteristic;

FIG. 15A is a cross sectional view showing a new/old detecting mechanism of the transfer belt unit in an enlarged manner;

FIG. 15B is a plan view showing a conductive portion of a base plate of the new/old detecting mechanism in FIG. 15A;

DETAILED DESCRIPTION OF THE INVENTION

Hereinafter, an embodiment according to the present invention will be described in detail with reference to the accompanying drawings.

Figure 1:
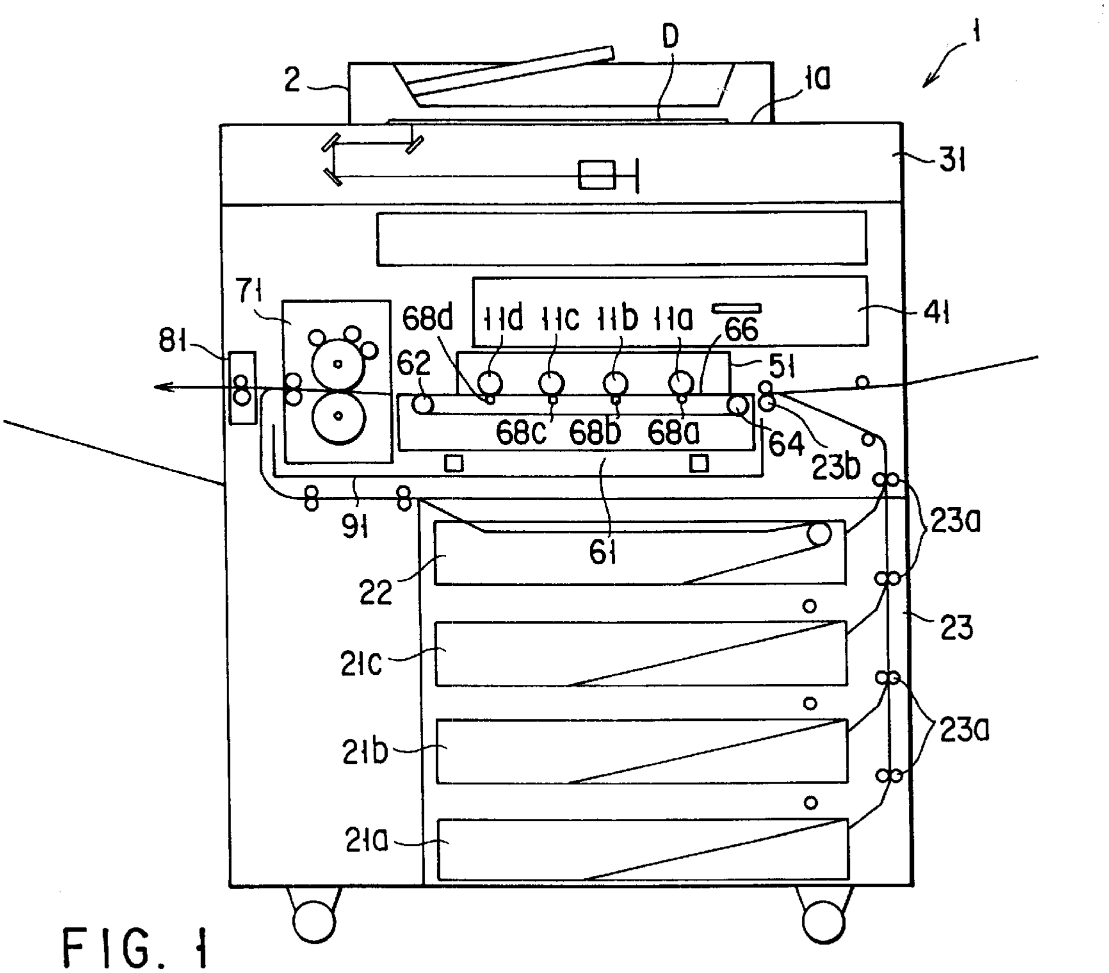
FIG. 1 is a schematic view showing a color copying machine mounting a transfer belt unit according to an embodiment of the present invention.
Figure 2:
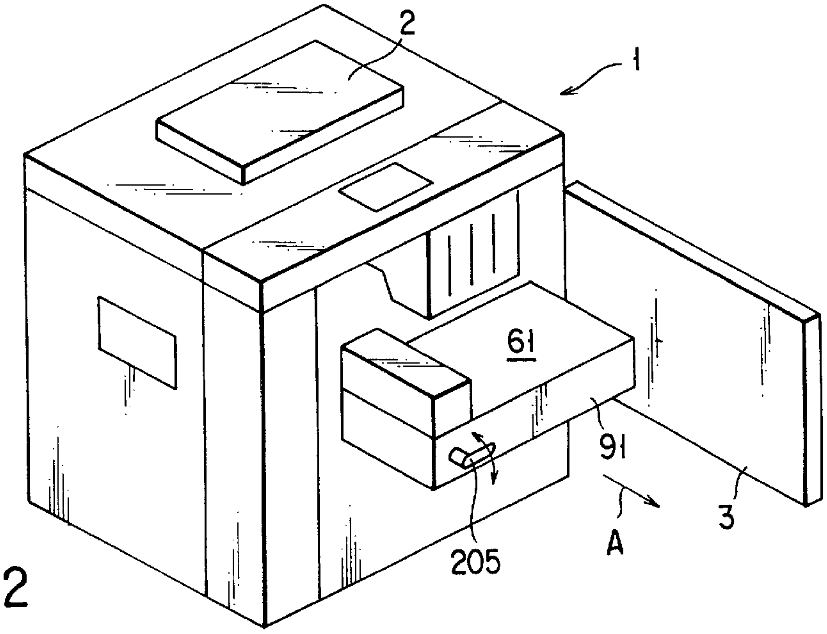
FIG. 2 is a perspective view of an outer appearance which shows a state of pulling out the transfer belt unit from a front side of the copying machine in FIG. 1.

FIG. 1 schematically shows a cross sectional view of a digital color copying machine 1 (hereinafter, simply refer to as a copying machine 1 or an apparatus main body 1) as an image forming apparatus mounting a transfer belt unit 61 according to the present invention. FIG. 2 schematically shows a state of opening a front cover 3 of the copying machine 1 by a perspective view.

As shown in FIG. 1, a plurality of paper cassettes 21*a,* 21*b* and 21*c* which respectively receive the plural sheets of paper having different sizes in an overlapping manner, and an automatic reversing apparatus 22 for reversing a paper having a first surface already copied are mounted below an inner portion of the main body of the copying machine 1 in a state of being stacked in a vertical direction. A paper supplying apparatus 23 for conveying the paper taken out from each of the paper cassettes or the automatic reversing apparatus is arranged in a right side in the drawing of the paper cassettes 21*a,* 21*b* and 21*c* and the automatic reversing apparatus 22. The paper supplying apparatus 23 has a plurality of conveying rollers 23*a* and aligning rollers 23*b.*

A transparent manuscript mounting table 1*a* for mounting a manuscript D is provided in an upper portion of the apparatus main body 1. A manuscript automatic feeding apparatus 2 (ADF2) for automatically feeding the manuscript D onto the manuscript mounting table 1*a* and pressing the mounted manuscript D is mounted in a further upper portion of the manuscript mounting table 1*a* so as to be freely opened and closed with respect to the manuscript mounting table 1*a.*

A scanner apparatus 31 for reading an image of the manuscript D mounted on the manuscript mounting table 1*a* is arranged below the manuscript mounting table 1*a.* A laser exposure apparatus 41 for exposing and scanning respective photosensitive drums 11*a,* 11*b,* 11*c* and 11*d* corresponding to respective colors on the basis of image data read out from the manuscript D and forming an electrostatic latent image corresponding to the respective colors on respective surfaces of the drums is arranged further below the scanner apparatus 31.

A process unit 51 is arranged below the laser exposure apparatus 41. The process unit 51 has four electrophotographic type image forming portions, and the respective image forming portions include photosensitive drums 11*a,* 11*b,* 11*c* and 11*d.* The four image forming portions are provided in parallel in a line at a uniform interval. The process unit 51 is structured such as to arrange a charging device, a developing device, a cleaner, a static eliminator and the like which are not illustrated, around each of the photosensitive drums 11*a,* 11*b,* 11*c* and 11*d.*

The transfer belt unit 61 according to the present invention is arranged below the process unit 51. The transfer belt unit 61 has a drive roller 62, a driven roller 64 and a transfer belt 66 which is wound around the respective rollers 62 and 64 and tensioned therebetween. Further, four transfer rollers 68*a,* 68*b,* 68*c* and 68*d* (hereinafter, simply refer to as a transfer roller 68 as a whole) which are provided in an inner side of the transfer belt 66 so as to oppose to the respective photosensitive drums 11*a,* 11*b,* 11*c* and 11*d* mentioned above substantially in a lower portions in a vertical direction thereof. The transfer belt unit 61 is positioned by a mechanism mentioned below so that the transfer belt 66 is rolled on and contacted with four photosensitive drums 11*a,* 11*b,* 11*c* and 11*d* mentioned above.

A fixing device 71 is provided in a left side in the drawing of the transfer belt unit 61. The fixing device 71 serves to fix the toner image with the respective colors transferred on the paper in an overlapping manner by passing through a portion between the process unit 51 and the transfer belt unit 61, on the paper. A paper discharging apparatus 81 for discharging the paper on which the color image is formed out of the apparatus main body 1 is provided in a further left side of the fixing device 71.

Further, a table unit 91 mounting the transfer belt unit 61 and the fixing device 71 so as to attach to and detach from the apparatus main body 1 is provided below the transfer belt unit 61. The table unit 91 is structured, as shown in FIG. 2, such as to be pulled out from the apparatus main body 1 in a direction of an arrow A in the drawing as a drawer of a cabinet in a state of opening the front cover 3 of the copying machine 1.

Hereinafter, the transfer belt unit 61 mentioned above will be further in detail described.

Figure 3A:
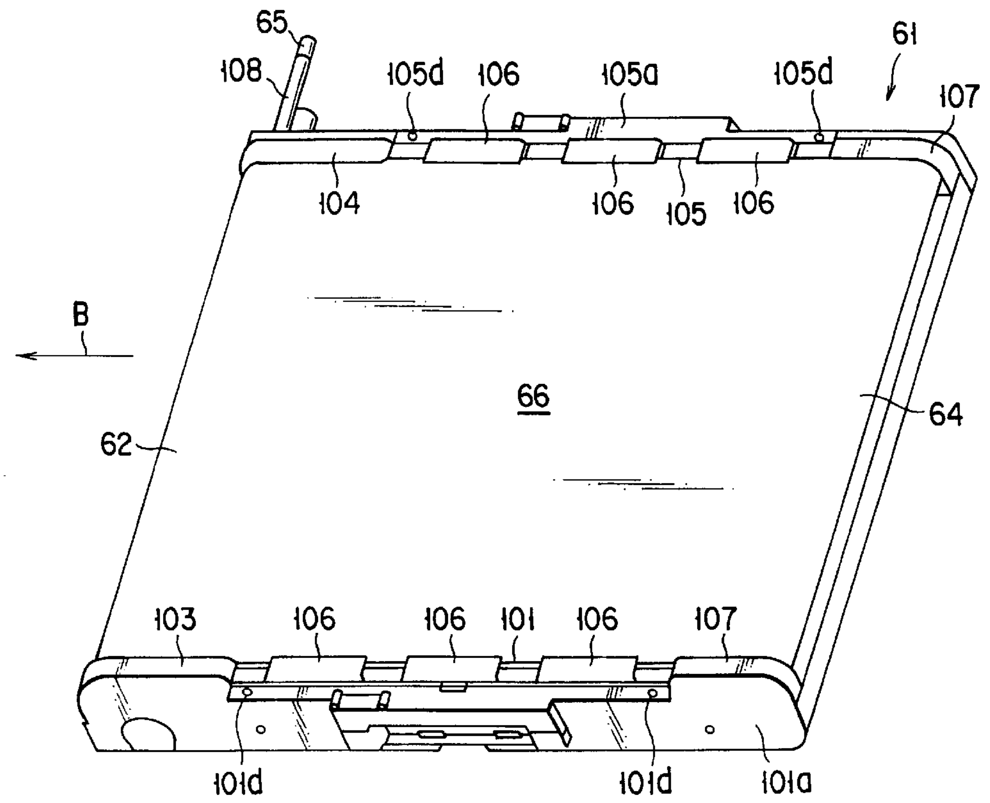
FIG. 3A is a perspective view of the transfer belt unit as seen from a front side of the apparatus.
Figure 3B:
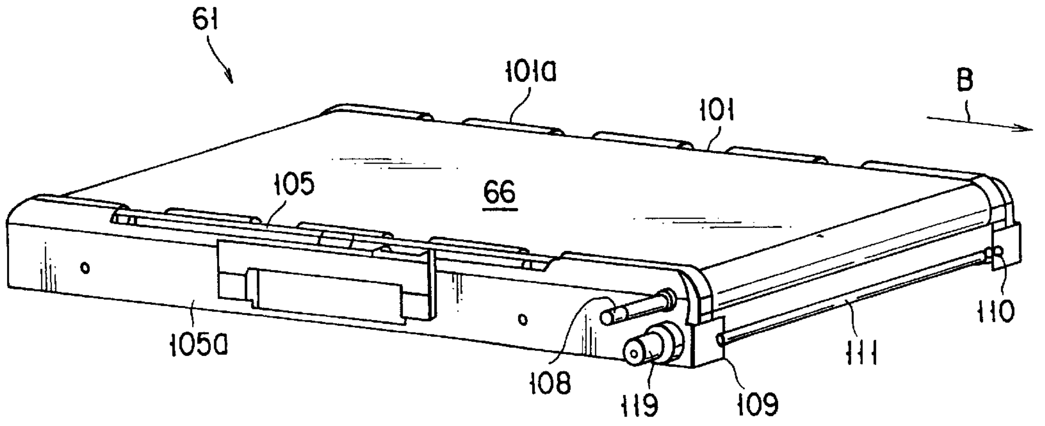
FIG. 3B is a perspective view of the transfer belt unit as seen from a rear side of the apparatus.

FIG. 3A is a perspective view of the transfer belt unit 61 as seen from a front side of the apparatus, and FIG. 3B is a perspective view of the transfer belt unit 61 as seen from a rear side of the apparatus.

The transfer belt unit 61 has the drive roller 62 and the driven roller 64 which are apart from each other and extend substantially in parallel, the transfer belt 66 which is wound around a pair of these rollers 62 and 64, tensioned therebetween and can run in an endless manner, and a plurality of transfer rollers 68 which are arranged in an inner side of the transfer belt 66.

The transfer belt 66 adheres the paper on an upper surface thereof in an electrostatic manner and conveys it in a direction of an arrow B in the drawing. The transfer belt 66 is made of a material of a polyimide group. In particular, it has a thickness of about 0.1 mm and a characteristic of an electric resistance of about $10^{11}\Omega$. In addition, a teflon group, a PET group, a rubber group and the like can be selected for the material of the transfer belt 66.

A pair of belt frames 101 and 105 which respectively support rotary shafts of the drive roller 62 and the driven roller 64 in a freely rotating manner and cover the inner side of the transfer belt 66, are arranged in both sides of the transfer belt 66 along the running direction B of the transfer belt 66, that is, a front side and a rear side of the transfer belt 66. Frame covers 101*a* and 105*a* are respectively mounted to further outer sides of these belt frames 101 and 105.

These frame covers 101*a* and 105*a* serve as a wrapping cover of the belt frame and also serve as a handle by which the user carries the transfer belt unit 61. Further, a plurality of projections 101*d* and 105*d* for positioning the transfer belt unit 61 with respect to the process unit 51 when mounting the transfer belt unit 61 to the apparatus main body 1 are provided in an upper end of each of the frame covers 101*a* and 105*a.*

Further, restricting plates 103 and 104 are respectively mounted to the belt frames 101 and 105. The restricting plates 103 and 104 are respectively mounted to the inner sides of the belt frames 101 and 105 so as to be close to the rotary shaft of the drive roller 62, and are brought into contact with the end portions in the front side and the rear side of the transfer belt 66 so as to restrict a zigzag movement of the transfer belt 66. Further, the restricting plates 103 and 104 also serve as a dust preventing cover for preventing foreign materials such as a toner, a developing agent, a paper powder and the like from entering the inner side of the transfer belt 66.

Further, a plurality of plastic covers 106 for preventing the foreign material from entering the inner side of the transfer belt 66 in the same manner as the restricting plates 103 and 104, are mounted to the respective belt frames 101 and 105. These covers 106 are made of plastic for the purpose of preventing a leakage from generating.

That is, since a bias voltage of 4 kV at the maximum is applied to each of the transfer rollers 68*a,* 68*b,* 68*c* and 68*d* arranged in the inner side of the transfer belt 66 and a voltage of 500V to 1 kV is also applied to each of the photosensitive drums 11*a,* 11*b,* 11*c* and 11*d,* it is necessary to make the cover 106 of an insulating material such as a plastic and the like for the purpose of preventing a leakage. Since not only a poor image is generated but also a serious bad influence is given to the apparatus if the leakage is generated, it is impossible to form the cover 106 by a sheet metal and the like.

Further, a cover 107 which also serves as a restricting plate is mounted to each of the belt frames 101 and 105 near both ends of the rotary shaft of the driven roller 64. Since these covers 107 are apart from the transfer roller 68 and the photosensitive drum 11, a metal material may be employed.

The end portion in the rear side of the rotary shaft 108 of the drive roller 62 extends through the rear belt frame 105 and the frame cover 105*a* and projects therefrom. A spline 65 is formed at the end projecting to the rear side of the rotary shaft 108. When the transfer belt unit 61 is mounted to the apparatus main body 1, a transfer belt drive portion (mentioned below) mounted to the side of the apparatus main body 1 and the spline 65 are connected to each other. Accordingly, the drive force from the transfer belt drive portion is transmitted to the rotary shaft 108 via the spline 65 and the drive roller 62 is rotated, so that the transfer belt 66 is driven in the direction of the arrow B at a desired speed.

Further, a belt cleaning apparatus 111 extending substantially in parallel to the rotary shaft 108 of the drive roller 62 is arranged below the drive roller 62 as shown in FIG. 3B. The belt cleaning apparatus 111 has a cleaning blade (mentioned below) for scraping off a non-transferred toner left on the transfer belt 66 and a recovery apparatus (mentioned below) for recovering the scraped off toner. Both ends of the cleaning apparatus 111 are fixed to the belt frames 101 and 105 by means of screws 109 and 110.

Figure 4:
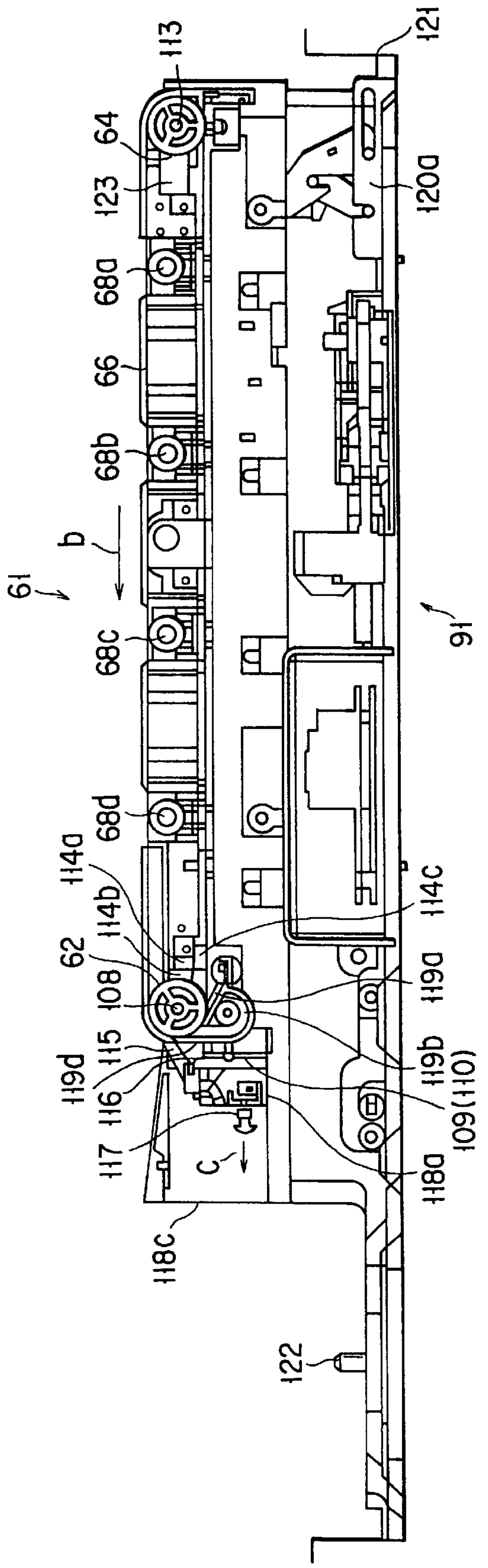
FIG. 4 is a schematic view showing a state of setting the transfer belt unit to a table unit pulled out from a main body of the apparatus in the copying machine.
Figure 5:
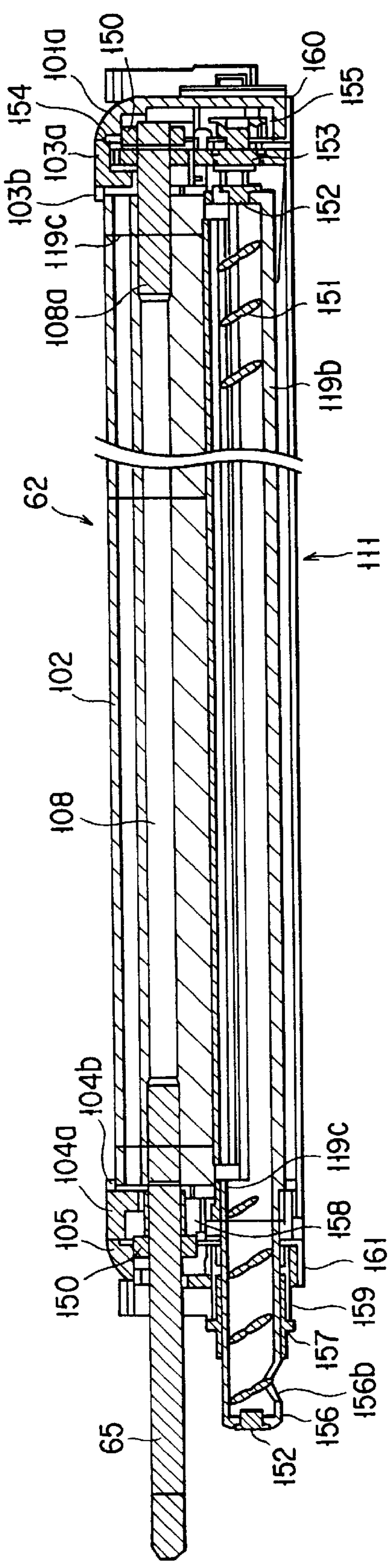
FIG. 5 is a cross sectional view along an axial direction of a drive roller and a cleaning apparatus in the transfer belt unit.
Figure 6:
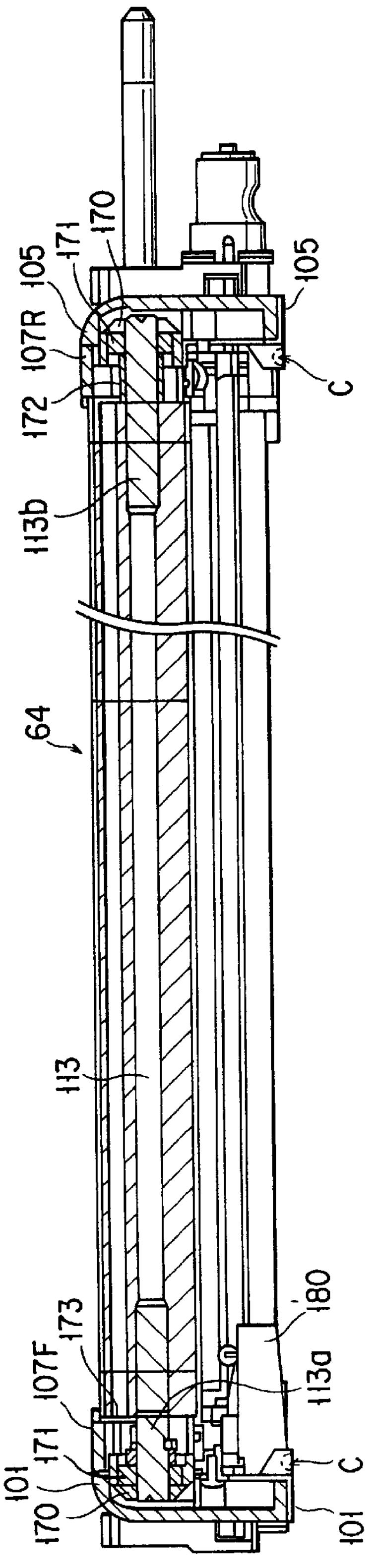
FIG. 6 is a cross sectional view along an axial direction of a driven roller in the transfer belt unit.

FIG. 4 shows a state of setting the transfer belt unit 61 mentioned above onto the table unit 91. FIG. 5 is a cross sectional view along an axial direction of the drive roller 62 of the transfer belt unit 61 and the cleaning apparatus 111. FIG. 6 is a cross sectional view along an axial direction of the driven roller 64 of the transfer belt unit 61.

As shown in FIG. 4, the transfer belt unit 61 is set on the table unit 91 and mounted to the apparatus main body 1 by inserting the table unit 91 into the apparatus main body 1. When inserting the table unit 91 into the apparatus main body 1, the spline 65 mentioned above of the drive roller 62 is connected to the transfer belt drive portion mentioned below provided in the side of the apparatus main body 1.

As shown in FIG. 5, the drive roller 62 is formed by an aluminum extruded material, a shaft 108*a* formed by plating on a stainless or a free cutting steel is strongly pressure-fitted into the end portion in the front side of the rotary shaft 108 thereof, and a secondary processing for securing an accuracy for a vibration and the like is applied.

As shown in FIG. 6, the driven roller 64 is also formed by the aluminum extruded material in the same manner as that of the drive roller 62, shafts 113*a* and 113*b* formed by plating on a stainless or a free cutting steel is strongly pressure-fitted into both ends of a rotary shaft 113 thereof, and a secondary processing for securing an accuracy for a vibration and the like is applied.

The driven roller 64 is often formed in a taper roller for preventing a zigzag motion of the transfer belt 66. In this case, a tapering direction of the driven roller 64 is different according to the material of the transfer belt 66. That is, in the case that the material of the transfer belt 66 has a nature of a rubber, a diameter of the end portion of the driven roller 64 in the side to which the transfer belt 66 is moved close is increased, and in the case that the material of the transfer belt 66 has a nature of a plastic, a diameter of the end portion in the side to which the transfer belt 66 is moved close is reduced.

Further, in order to restrict the change of rotation due to a slip of the transfer belt 66, a spring is arranged in both ends of the driven roller 64 so as to urge the driven roller 64 in a direction of moving apart from the drive roller 62. Accordingly, a predetermined tension is applied to the transfer belt 66 so as to restrict the slip of the transfer belt 66 against the drive roller 62. It has been experimentally known that a tension of the transfer belt 66 at a level equal to or more than 3 kg/cm in one side is required for restricting the change of rotation of the transfer belt 66.

As shown in FIG. 6, a member obtained by lightly pressure-fitting a bearing 171 to a sliding member 170, for example, made of polyacetal is mounted to each of the shafts 113*a* and 113*b* provided in both ends of the rotary shaft 113 of the driven roller 64. Then, these members are gripped between the belt frames 101 and 105 and the restricting plate 107 so as to be applied a freedom along a traveling direction of the transfer belt 66, and are urged by the spring so as to be urged in a direction that the driven roller 64 moves apart from the drive roller 62.

Further, the driven roller 64 is pressed to the front side of the apparatus in order to prevent a zigzag motion of the transfer belt 66. That is, since there is a problem that the transfer belt 66 moves in a zigzag manner when the driven roller 64 is moved in the front side or the rear side, it is necessary to always press the driven roller 64 in the side to which it is desired to restrict the transfer belt, that is, in the front side. Accordingly, the rotary shaft 113 of the driven roller 64 is pressed to the front side by a spring 172 mounted to the rear shaft 113*b* and a play removing spacer 173 mounted in the front shaft 113*a*.

In the same manner, the drive roller 62 is urged to the front side by mounting the spring 158 to the rear side of the rotary shaft 108 (FIG. 5). In this case, a gear 154 is mounted to the shaft 108*a* in the front side of the rotary shaft 108 in place of the play removing spacer.

Further, when arranging the drive roller 62 and the driven roller 64 in a positional relationship mentioned above and moving the transfer belt 66 in the direction mentioned above, the upper side of the transfer belt 66 opposing to the photosensitive drums 11*a,* 11*b,* 11*c* and 11*d* is set to a tension side. It is possible to stably move the transfer belt 66 by bringing the tension side of the transfer belt 66 into contact with the photosensitive drums 11*a,* 11*b,* 11*c* and 11*d* in a rolling manner, further, it is possible to stably restrict the zigzag motion of the transfer belt 66 and it is possible to stabilize a pressing force of the transfer belt 66.

Then, as already explained with reference to FIGS. 3A and 3B, the cover 106 for dust prevention is mounted to each of the belt frames 101 and 105, however, there is a case that a foreign material enters the inner side of the transfer belt 66 for some reason. When the foreign material enters the inner side of the transfer belt 66, a dirt is attached to the inner surface of the transfer belt 66 and the surface of the drive roller 62. When a dirt is attached to the inner surface of the transfer belt 66 and the surface of the drive roller 62, an apparent roller diameter of the drive roller 62 is changed, and a running speed of the transfer belt 66 is changed, so that there is a possibility that the transfer belt 66 does not move close to the front side because the pressing force of the transfer belt 66 is reduced, or the end portion in the front side of the transfer belt 66 is damaged so as to give a bad influence to a zigzag motion control because the pressing force is too strong. Further, when a dirt is attached to the surface of the drive roller 62 and the inner surface of the transfer belt 66, a slippage is generated between the transfer belt 66 and the drive roller 62, thereby possibly generating unevenness of a speed and giving a bad influence to the image. In order to prevent the disadvantage mentioned above, a mechanism for cleaning the surface of the drive roller 62 and the inner side of the transfer belt 66 is required.

FIG. 4 illustrates a cleaning mechanism for cleaning the inner surface of the transfer belt 66 and the surface of the drive roller 62. The cleaning mechanism has a cleaning member 114*b* slidably brought into contact with the surface of the drive roller 62, a cleaning member 114*c* slidably brought into contact with the inner surface of the transfer belt 66, and a holder 114*a* which holds the cleaning members 114*b* and 114*c* so as to respectively press them onto the inner surface of the transfer belt and the surface of the drive roller 62 at a predetermined pressure. The holder 114*a* is mainly made of a sheet metal or the like. The cleaning members 114*b* and 114*c* are made of a material such as a felt or the like and adhered to the holder 114*a* by means of an adhesive double coated tape or the like.

When the cleaning member 114*b* slidably brought into contact with the drive roller 62 eats into the drive roller 62 to much, a load against the drive roller 62 is increased, so that a load is applied to a motor for rotating the drive roller 62 and a bad influence is given to a restriction of a zigzag motion of the transfer belt. Accordingly, it is necessary to adjust an eating amount of the cleaning member 114*b* against the drive roller 62 to a suitable value.

A suitable eating amount δ of the cleaning member 114*b* and a suitable length s toward the drive roller 62 satisfy the following formula. In this case, the eating amount of the cleaning member 114*b* is set to δ (mm), the length is set to s (mm) and a radius of the drive roller 62 is set to r (mm).

$$15° \leqq \cos^{-1}(r-\delta)/r \leqq 30° \quad (1)$$

$$\begin{aligned} s &= 2\sqrt{r^2-(r-\delta)^2} \\ &= 2\sqrt{2r\delta-\delta^2} \end{aligned} \quad (2)$$

Here, 15 degrees and 30 degrees correspond to values determined by experiments, and the eating amount becomes a little and in some cases, a poor cleaning is caused when the value is less than 15 degrees. Further, when the value becomes over 30 degrees, a contact force to the drive roller 62 becomes strong, so that the load against the roller is increased and there is a possibility that the disadvantage mentioned above is generated. Accordingly, the eating amount δ of the cleaning member 114*b* is suitable in a range expressed by the formula (1).

Further, since the suitable length s of the cleaning member 114*b* is expressed by the formula (2), it is sufficient to set a length of the felt to be larger than s.

To the contrary, since the cleaning member 114*c* for cleaning the inner side of the transfer belt 66 is arranged in a slack side of the transfer belt 66, it is necessary to change an eating amount η thereof in correspondence to a distance from the drive roller 62.

An amplitude of the transfer belt 66 in the slack side is set to×(mm) in an amplitude of a primary mode as well as the eating amount is set to η (mm) and the distance between the drive roller 62 and the driven roller 64 (the distance between centers thereof) is set to L (mm). The amplitude of the primary mode becomes 2×(mm) at the maximum at a position of (L/2). When arranging so that the center of the cleaning member 114*c* is disposed at a position u (mm) apart from the center of the drive roller 62, an amplitude p (mm) at that position satisfies the following formula (3).

$$u:p=(L/2):xp=2xu/L \quad (3)$$

When factor of safety is set to 1.5, the eating amount η of the cleaning member 114*c* with taking the factor of safety into consideration is expressed by the following formula $$\eta=1.5p \quad (4)$$

In the present embodiment, since the relationship x=3, u=22 and L=362 is established, it is known that the amplitude satisfying the relationship p=0.36 (mm) is obtained and the eating amount satisfies the relationship η=0.55 (mm).

Next, the transfer roller 68 assembled in the transfer belt unit 61 will be described.

As shown in FIG. 4, a yellow transfer roller 68*a* (a first transfer roller), a magenta transfer roller 68*b* (a second transfer roller), a cyan transfer roller 68*c* (a third transfer roller) and a black transfer roller 68*d* (a fourth transfer roller) are arranged in the inner side of the transfer belt 66 at a positional relationship opposing to the respective photosensitive drums 11*a,* 11*b,* 11*c* and 11*d* in the process unit 51. A suitable bias voltage (DC) is applied to the respective transfer rollers 68, and the toner image with the respective colors formed on the surface of the respective photosensitive drums are successively transferred onto the paper conveyed onto the transfer belt 66 in a sucked and held state. At this time, the bias voltages applied to the respective rollers 68 generally become higher in the following order.

First transfer roller<second transfer roller<third transfer roller<fourth transfer roller As mentioned above, by changing the magnitude of the bias voltage step by step, the toner already transferred on the paper is not taken out to the side of the photosensitive drum in the transfer portion disposed in the downstream side along the direction of conveying the paper, and it is possible to further transfer another color toner on the toner transferred on the paper in an overlapping manner.

Figure 7:
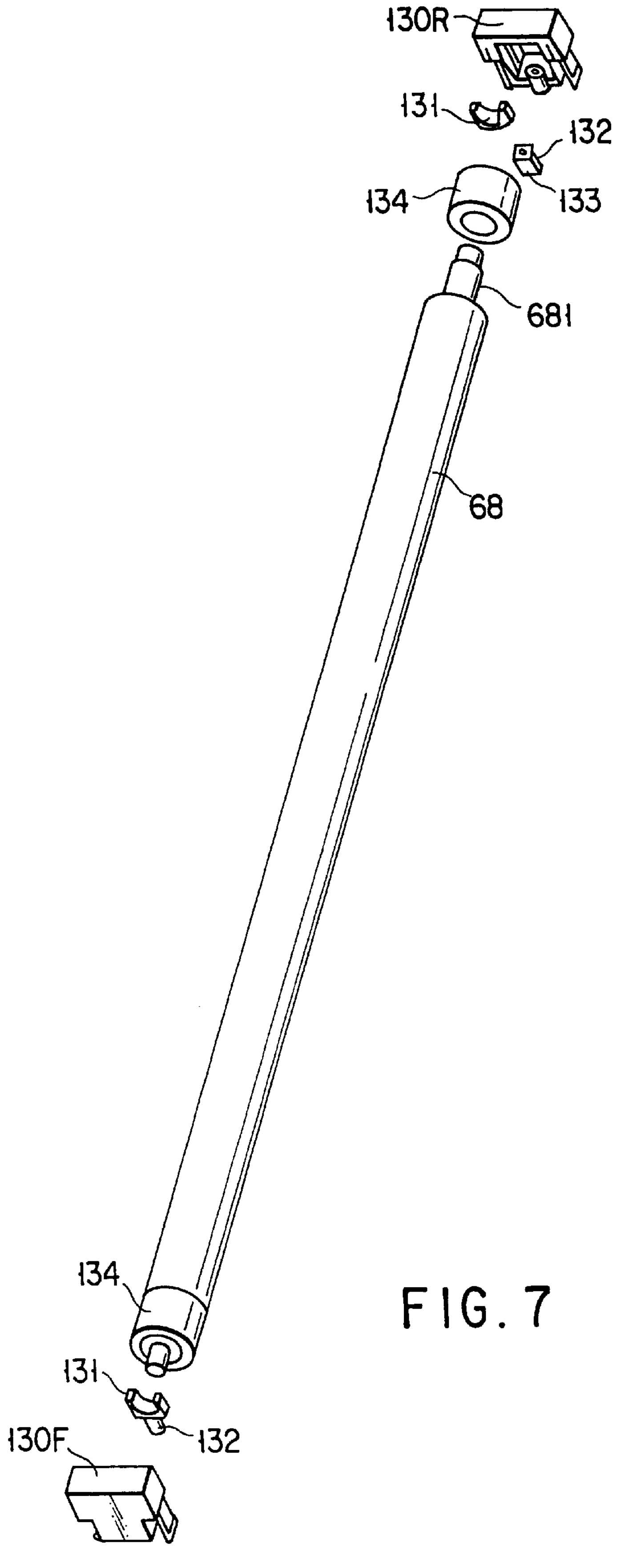
FIG. 7 is an exploded perspective view of a transfer roller which is integrally assembled in the transfer belt unit.
Figure 8:
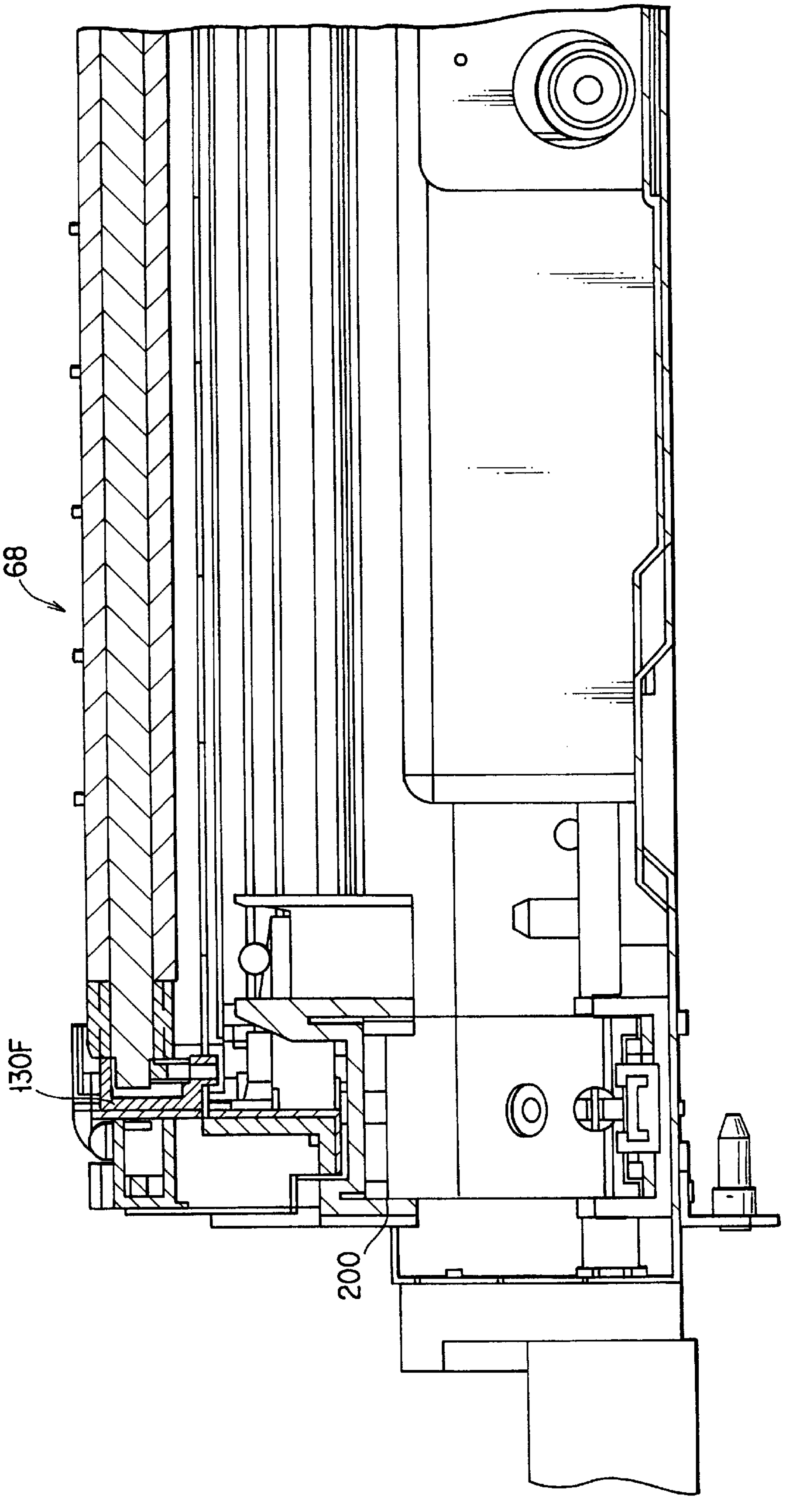
FIG. 8 is a cross sectional view showing an end portion in a front side of the transfer roller assembled in the transfer belt unit.
Figure 9:
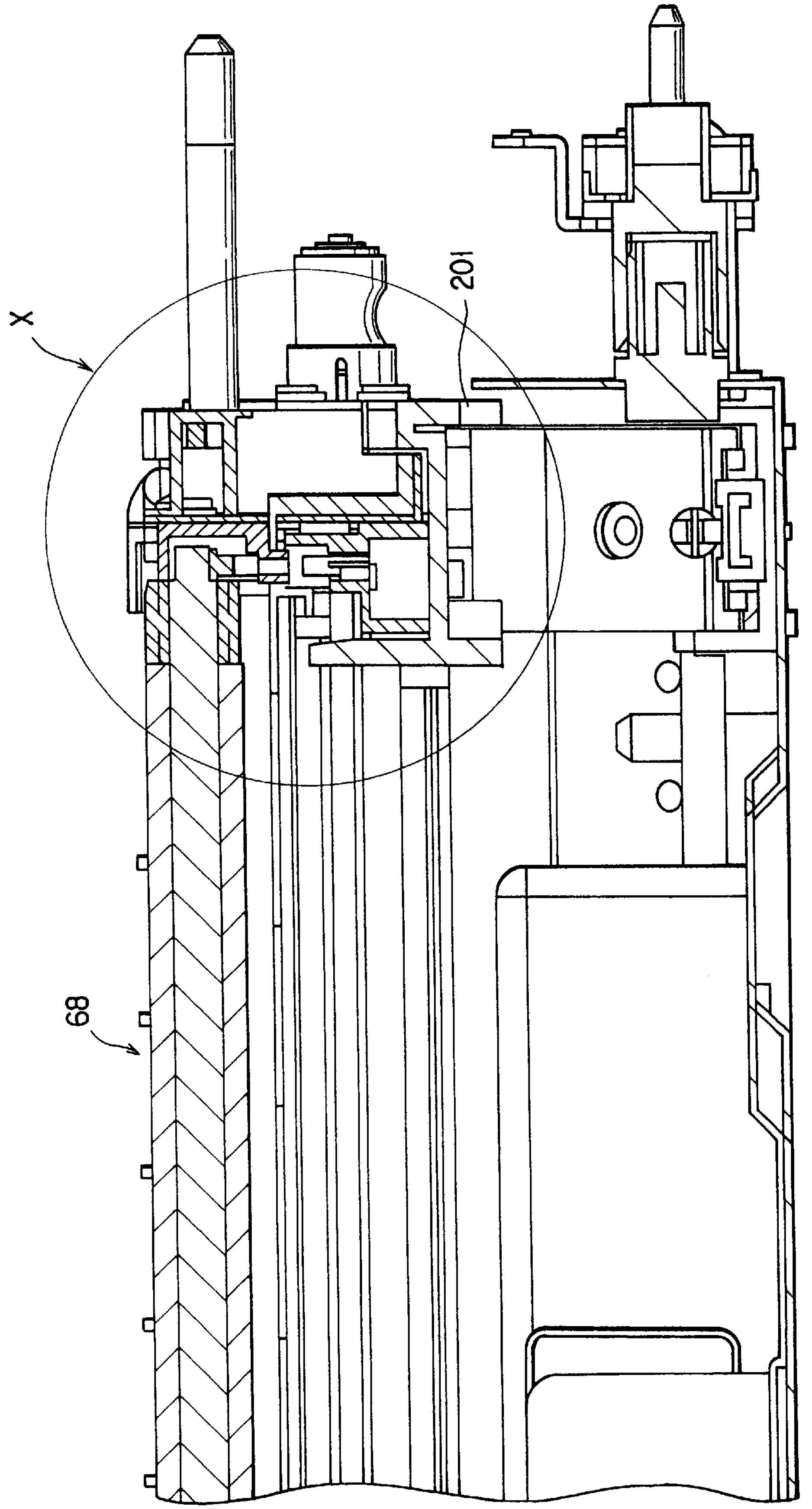
FIG. 9 is a cross sectional view showing an end portion in a rear side of the transfer roller assembled in the transfer belt unit.
Figure 10:
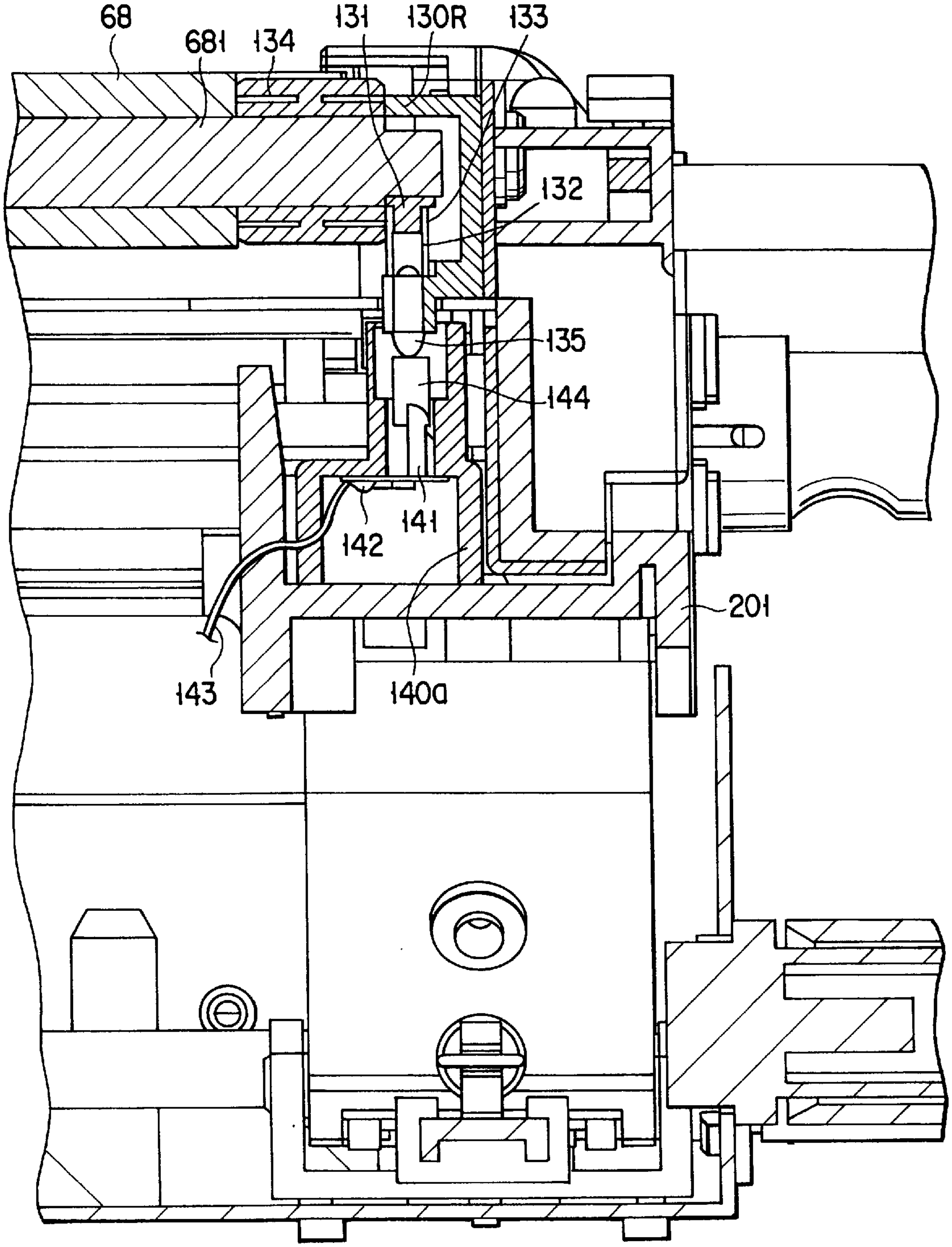
FIG. 10 is a cross sectional view showing an area A in FIG. 9 in an enlarged manner.

FIG. 7 is an exploded perspective view of the transfer roller 68, FIG. 8 is a cross sectional view near the end portion in the front side of the transfer roller 68, FIG. 9 is a cross sectional view near the end portion in the rear side of the transfer roller 68 and FIG. 10 is an enlarged detailed view of a portion X in FIG. 9, that is, an enlarged view of the portion near the end portion in the rear side of the transfer roller 68.

As shown in FIG. 7, the transfer roller 68 has a metal shaft 681. A conductive foam rubber is integrally formed with the metal shaft 681, or a cylindrical rubber portion is pressure-fitted thereto or fixed thereto with using a conductive adhesive material.

An electric resistance of the conductive foam rubber is set to $10^6\Omega$ or less. Further, a hardness of the conductive foam rubber is set to about 30 degrees (asca C), that is, a very low hardness. Accordingly, when the transfer roller 68 is always brought into contact with the photosensitive drum 11 via the transfer belt 66, there is a possibility that a creep is generated and the roller is deformed. Therefore, deformation preventing members 134 are respectively mounted to both ends of the metal shaft 681.

As shown in FIG. 10 in an enlarged manner, the deformation preventing member 134 is assembled with no gap between the transfer roller 68 and a power supply terminal 130R (130F). Accordingly, the dirt of the toner, the developing agent, the paper powder and the like do not enter within the power supply terminal 130R. That is, the deformation preventing member 134 serves as a protecting cover for the transfer roller 68 and the power supply terminal 130R.

A bearing 131 of the transfer roller 68 is mounted to the front end portion of the metal shaft 681 in the transfer roller 68 which extends through and projects from the deformation preventing member 134. The bearing 131 serves as a member for supplying power to the transfer roller 68 and a bearing for the transfer roller 68. Accordingly, a plastic material having a conductivity and a slidability must be employed for the bearing 131. In the present embodiment, a conductive polyacetal or a conductive nylon is employed as a material for the bearing 131.

A spring 132 for always urging the transfer roller 68 toward the photosensitive drum 11 is mounted to a lower portion of the bearing 131. The bearing 131 is urged upward by the spring 132, and the transfer roller 68 is always brought into contact with the photosensitive drum 11 via the transfer belt 66.

In the case of transferring the toner image formed on the surface of the photosensitive drum 11 on the paper conveyed via the transfer belt 66, a pressing force of the spring 132 which lifts up the transfer roller 68, that is, a linear pressure of the transfer roller 68 with respect to the photosensitive drum becomes important. If the linear pressure of the transfer roller 68 is higher than a predetermined value, there is generated a poor image that omissions or the like are generated at an image solid edge portion, in particular, at an edge where the colors are overlapped. To the contrary, if the linear pressure of the transfer roller 68 is weaker than a predetermined value, an insufficient transfer is occurred, an image becomes light and a poor image is generated.

A suitable linear pressure of the transfer roller 68 against the photosensitive drum 11 can be briefly calculated as follows with supposing that the shafts of the photosensitive drum 11 and the transfer roller 68 are not bent.

When setting a length of a contact portion of the transfer roller 68 with the photosensitive drum 11 to h (mm) and a pressing force to q (g), a linear pressure w (g/mm) of the transfer roller 68 is expressed by the following formula.

$$w=q/h \tag{5}$$

The suitable value of the linear pressure w is related to the hardness of the transfer roller 68, however, in the case that the hardness of the transfer roller 68 is equal to or less than 40 degrees, it has been known according to the experiments that the following formula is established.

$$1.5\text{(g/mm)} \leqq w \leqq 3.5\text{(g/mm)} \tag{6}$$

The lifting-up spring 132 of the transfer roller 68 employed in the present embodiment generates the pressing force of 300 (g) or 400 (g) when the transfer roller 68 is brought into contact with the photosensitive drum 11, and since the length h of the contact portion between the transfer roller 68 and the photosensitive drum 11 is expressed by h=312 (mm), the linear pressure w (g/mm) of the transfer roller 68 is expressed by w=300×2/312=1.92 (g/mm) in the case of 300 (g) and w=400×2/312=2.56 (g/mm) in the case of 400 (g).

As shown in FIG. 7, the end portion in the front side of the transfer roller 68 is assembled in the terminal 130F in a state of compressing the spring 132. By making the structure in the manner mentioned above, the bearing 131 can slide within the terminal 130F in a vertical direction. The terminals 130F and 130R arranged at both ends of the transfer roller 68 are made of a material having a good insulation for preventing the bias voltage for transferring from leaking, for example, PPO, PPE or the like.

The rear terminal 130R serves as a power supply portion, and is conducted with a terminal from a high pressure transformer. That is, a power supply from the apparatus main body 1 to the transfer belt unit 61 is performed via the rear terminal 130R. The same parts as those of the front terminal 130F are used for the rear terminal 130R.

As shown in FIG. 10, the power supply portion in the side of the apparatus main body 1 and the transfer roller 68 are conducted with each other via a screw 135 mounted to the lower end of the terminal 130R. The screw 135 is fastened from the lower portion of the terminal 130R, and a front end thereof is exposed to the inner side of the terminal 130R. The power supply member 133 is fitted to the exposed front end of the screw 135. Further, the spring 132 for lifting up the transfer roller 68 is fitted to the front end of the screw 135. Further, the power supply member 133 is fitted to a convex portion of the bearing 131 and the other end of the spring 132 is fitted thereto.

By making the structure in the manner mentioned above, in the same manner as that of the front side, the bearing 131 can slide in the inner side of the terminal 130R in a vertical direction. In this case, the power supply member 133 is made of PET vacuum evaporating an aluminum, which is vacuum evaporated at a thickness of about 100 ($\mu$m) in one side. In the power supplying method according to the present embodiment, the screw 135 and the conductive plastic are directly conducted, and the spring 132 for lifting up the transfer roller 68 does not serve for supplying power.

Here, a description will be given of a method of supplying power to the transfer belt unit 61 from the apparatus main body 1.

The transfer belt unit 61 is mounted to a table unit 91 along a front guide 200 (refer to FIG. 8) and a rear guide 201 (refer to FIG. 9). At this time, the screws 135 provided in the end portion in the rear side of the respective transfer rollers 68*a*, 68*b*, 68*c* and 68*d* are brought into contact with the power supply terminal 140 mounted to the rear guide 201. FIG. 10 shows a contacting state.

When the transfer belt unit 61 is mounted to the table unit 91 along the guides 200 and 201, the screw 135 and a power supply compression spring 144 within the power supply terminal 140 are brought into contact with each other and the transfer belt unit 61 is under a conductive state with respect to the cable unit 91. The power supply compression spring 144 is screwed into the power supply holder 141, so that a secure contact state can be kept. Further, the power supply holder 141 is mounted to the power supply terminal 140 and is commonly fastened to a round terminal side of a high voltage cable 143 having a round terminal at one end and a fasten terminal at the other end by a screw 142. The other end of the high voltage cable 143, that is, the fasten terminal side is connected to a terminal of the high voltage transformer 220 (refer to FIG. 19) provided in the side of the apparatus main body 1.

Figure 11:
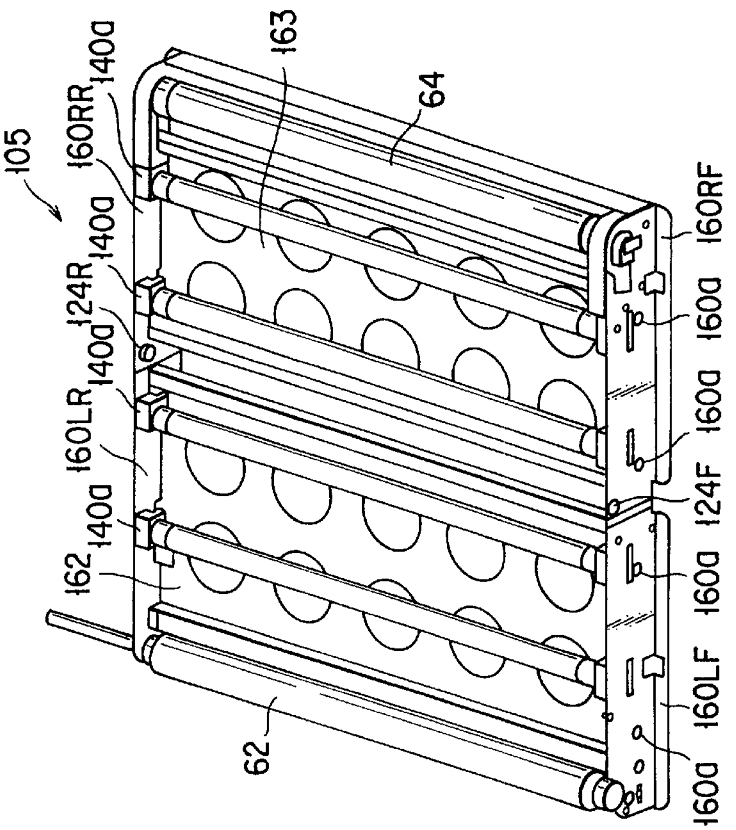
FIG. 11 is perspective view showing a state of taking out a transfer belt and a frame cover from the transfer belt unit.

The power supply terminal 140 is made of a plastic having a good insulation, for example, PPO or PPE in the same manner as that of the terminal 130 of the transfer roller 68. The power supply terminal 140 is provided in correspondence to four colors comprising yellow (Y), magenta (M), cyan (C) and black (K) as shown in FIG. 11. With taking a productivity into consideration, the terminals for four colors may be integrally formed. It is possible to reduce a labor for fastening the screw by making the structure in the manner mentioned above.

Next, a description will be given of the restricting plates 103 and 104 mounted to the belt frames 101 and 105 at the position close to both ends of the drive roller 62.

In order to stably drive the transfer belt 66 so as to obtain a good image, in the method mentioned above, the pressing force toward the front side is applied to the transfer belt 66, thereby restricting the zigzag motion of the transfer belt 66. Further, the restricting plate 103 is mounted to the inner side of the front belt frame 101 supporting the rotary shaft 108 of the drive roller 62 so as to slidably bring the end portion in the front side of the transfer belt 66 into contact therewith.

When making the transfer belt 66 of plastic, in particular, polyimide group of plastic, the end portion of the belt is relatively hard, and a mechanical strength becomes strong. Accordingly, the belt end portion is cut away in some material forming the restricting plate 103, so that there is a case that the belt end portion enters the cut away portion of the restricting plate 103 and a bad influence is given to the zigzag motion control.

In the case of employing PS, ABS or POM groups of plastics as the material for the restricting plate 103, the cut away amount is increased, so that a trouble due to the cut away is generated. Accordingly, when forming the restricting plate 103 by using a metal group of material such as an aluminum die casting and the like, it is strong against being cut away and has no problem about a service life, however, an aluminum die casting requires a secondary processing and a cost is increased.

Further, when using a material of an engineering plastic group such as PPS, PI, an epoxy group of thermosetting resin and the like, a sufficient function for the restricting plate 103 is obtained. However, a portion of the restricting plate 103 which requires an abrasion resistance is only a little portion as shown by reference numeral 103*b* in FIG. 5. Accordingly, it is not necessary to use an expensive material for the upper portion of the restricting plate 103 serving as the cover. That is, when all the portion of the restricting plate 103 is produced by the material of the engineering plastic group, it becomes very expensive.

Accordingly, the portion 103*a* which does not require an abrasion resistance is made of plastic of PS and ABS group and the sheet metal 103*b* is insert molded thereto, thereby constructing the restricting plate 103. A dimensional accuracy required for the restricting plate 103 is dependent upon the sheet plate 103*b* and the molding is performed so that the shape of the sheet plate is not deformed at a time of molding, whereby an inexpensive restricting plate 103 can be produced.

Since the plastic portion 103*a* does not have a slidability, the material of PS and ABS group is sufficient, however, it is desirable to select these materials having a good flowability in comparison with the material such as POM in order to easily perform an integral molding. Generally, in the integral molding, it is impossible to separate the sheet metal portion 103*b* from the plastic portion 103*a,* however, taking a current environmental problem into consideration, it is desirable to separate them. Accordingly, it is necessary to form a groove portion for inserting a screwdriver or the like in the boundary portion between the sheet metal and the plastic so as to construct a separable structure which can be separated by inserting a tool such as the screwdriver and the like.

To the contrary, since the restricting plate 104 mounted to the rear belt frame 105 is structured such that the transfer belt 6 is always urged to the front side as mentioned above, the end portion of the transfer belt 66 is not always brought into contact therewith, however, the insert molded sheet metal is employed for the same reason as that of the front restricting plate 103.

The front restricting plate 103 is screwed and fixed to the front belt frame 101, and the rear restricting plate 104 is screwed and fixed to the rear belt frame 105.

To the contrary, the restricting plate 107 provided in the belt frame 101 at a position close to the end portion in the front side of the driven roller 64 has a positional relationship of the same phase as that of the sheet plate portion 103*b* of the restricting plate 103 mentioned above or of about 0.5 mm close to the side of the driven roller 64.

Figure 12:
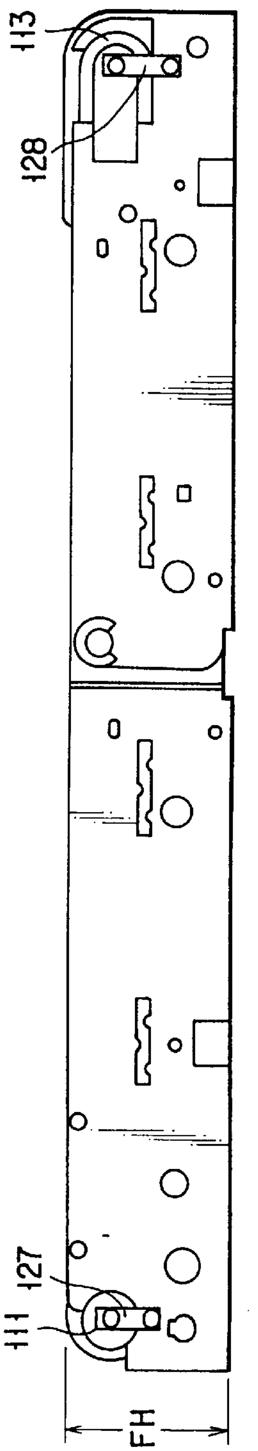
FIG. 12 is a front elevational view showing the transfer belt unit under a state shown in FIG. 11.
Figure 13:
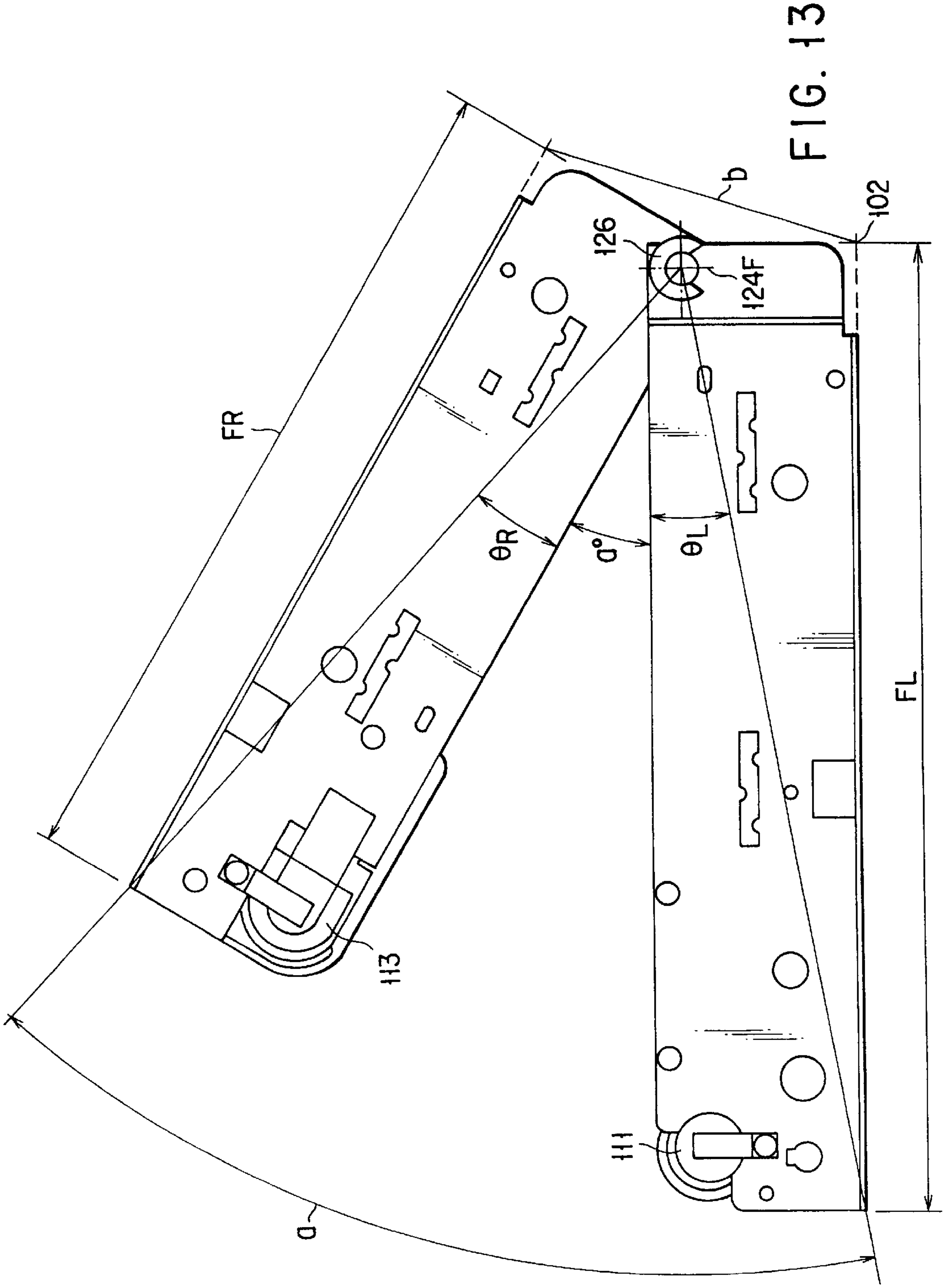
FIG. 13 is a schematic view showing a state of bending the transfer belt unit in FIG. 12 at a substantially center portion thereof.

FIG. 11 shows a state of taking out the transfer belt 66 and the frame covers 101*a* and 105*a* from the transfer belt unit 61. FIG. 12 is a front elevational view as seen from the front side of the transfer belt unit 61 in FIG. 11, and FIG. 13 is a front elevational view of a state of bending the transfer belt unit 61 in FIG. 11 at a substantially center portion.

As shown in FIG. 11, the belt frame 101 in the front side of the transfer belt unit 61 and the belt frame 105 in the rear side are separated so as to be freely bent at a substantially center portion. Hereinafter, a description will be given with setting the belt frame in the front side near the drive roller 62 to 160LF, the belt frame in the rear side near the drive roller 62 to 160LR, the belt frame in the front side near the driven roller 64 to 160RF and the belt frame in the rear side near the driven roller 64 to 160RR.

Stays 162 and 163 are mounted between the belt frames 101 and 105. The stay 162 in the side of the drive roller 62 is fixed to the belt frames 160LF and 160LR by a spot welding or a rivet. The stay 163 in the side of the driven roller 64 is fixed to the belt frames 160RF and 160RR by a spot welding or a rivet.

The power supply terminal 140*a* of each of the transfer rollers 68 is fixed to the stays 162 and 163 by fitting with no screw.

Further, the right and left belt frames in each of the front side and the rear side are rotatably connected by pins 124F and 124R and fixed by an E ring (not shown). Accordingly, the transfer belt unit 61 can be rotated from the state shown in FIG. 12 to the state shown in FIG. 13. Then, in the state of bending the belt frame as shown in FIG. 13, the transfer belt 66 in an endless state is wound around the drive roller 62 and the driven roller 64, the transfer belt 66 is set at a predetermined position, and thereafter the transfer belt unit 61 is returned to the state shown in FIG. 12. Therefore, it is possible to wind the transfer belt 66 between the drive roller 62 and the driven roller 64 without injuring the transfer belt 66.

Hereinafter, a consideration will be given of an inner peripheral length of the transfer belt 66 in the endless state and a size of the transfer belt unit 61 when winding the transfer belt 66 between two rollers 62 and 64 with reference to FIG. 13.

When setting the inner peripheral length of the transfer belt 66 to Lb (mm), a length of the belt frames 160LF and 160LR in the side of the drive roller 62 to FL (mm), a length of the belt frames 160RF and 160RR in the side of the driven roller 64 to FR (mm), a height of each of the belt frames to FH (mm) and an angle of rotation of the frame to a degree, and further setting a center of rotation to a portion near FL and FH for simplifying a calculation, it is necessary to satisfy the following formulas.

$$\mathrm{Arc}\,a < k^{*}Lb/\pi \qquad (7)$$

$$FL+\mathrm{Arc}\ a+FR+\text{straight line b} \leqq k^{*}Lb \qquad (8)$$

In this case, k in the above formulas is a constant equal to or less than 1 and expresses an easiness for setting the transfer belt 66.

Further, since the following formulas are established, $$\mathrm{Arc}a = 2\pi\sqrt{FL^2 + FH^2}\times(\theta_L + \alpha + \theta_R)/360$$

$$\theta_L=\tan^{-1}(FH/FL)$$

$$\theta_R=\tan^{-1}(FH/FR)$$

in the case of calculating the length of the arc a, the following formula is obtained with using the larger one of FL and FR.

$$b=2*FH\sin((180-\alpha)/2)$$

According to the formula mentioned above, a relationship between the angle of rotation a and the inner periphery of the belt can be introduced in the case that the length and the height of the frame is determined.

According to the present embodiment, since FL=216 (mm), FR=190 (mm), FH=45 (mm), $\alpha$=40 degrees and Lb=798 (mm), the following formula is established.

$$\mathrm{Arc}\ a=250<Lb/\pi=254\ (\mathrm{mm})$$

$$FL+\mathrm{Arc}\ a+FR+b=741\ (\mathrm{mm})$$

When setting k=1, the formulas (7) and (8) are satisfied, so that the transfer belt 66 can be taken out by rotating the belt frame to an angle of 40 degrees. If it is desired to easily attach and detach the belt with using a jig and the like so as not to injure the transfer belt 66, it is necessary to substantially set k=0.95 or k=0.9 and set the angle of rotation $\alpha$ to be small.

After mounting the transfer belt 66 in the manner mentioned above, a cleaning blade 119*a* (refer to FIG. 4) of the belt cleaning apparatus 111 mentioned above is pressed and mounted on the surface of the transfer belt 66 wound around the drive roller 62. The cleaning blade 119*a* scrapes away a waste toner such as a non-transferred toner on the transfer belt 66 or a positioning registration pattern directly written on the transfer belt 66 from the surface of the transfer belt 66. Without the cleaning blade 119*a*, the non-transferred toner is left on the surface of the transfer belt 66 and the toner is attached to the back side of the paper so as to generate a back dirt.

It is considered to be suitable that the cleaning blade 119*a* is brought into contact with the transfer belt 66 within a range between 5 degrees and 20 degrees from the center of the drive roller 62 with respect to the vertical lower portion of the drive roller 62. In view of only a cleaning performance, it is desirable to increase an angle of contact of the cleaning blade 119*a*, however, in the present embodiment, since the retracting mechanism mentioned below for retracting the peeling pawl 115 is provided near the drive roller 62, it is impossible to set the angle of contact of the blade 119*a* to very large. When the contacting position of the cleaning blade 119*a* is within the range of angle mentioned above, the cleaning blade 119*a* is brought into contact with a place where the transfer bell 66 is wound around the drive roller 62, so that the zigzag motion of the transfer belt 66 is not generated and a stable cleaning performance can be obtained.

In the case that the contacting position of the cleaning blade 119*a* is disposed at the position close to the side of the driven roller 64 from the vertical direction of the center of the drive roller 62, the cleaning blade 119*a* is brought into contact with the slack side of the transfer belt 66. Accordingly, in order to obtain a stable cleaning performance, it is necessary to provide a member such as the sheet metal and the like for stabilizing the travelling of the transfer belt 66 in the inner side of the transfer belt opposing to the contact position of the cleaning blade 119*a*. In this case, a cost will be increased.

Since the state of the surface of the transfer belt 66 is worse than the state of the surface of the photosensitive drum 11, a coefficient of friction of the transfer belt 66 is greater than the photosensitive drum 11 and the diameter of the drive roller 62 is relatively small, it is preferable that a hardness of the cleaning blade 119*a* and a Young's modulus expressing a mechanical strength are relatively high. Further, it is possible to increase the cleaning performance of the transfer belt 66 by setting an elasticity of restitution of the cleaning blade 119*a* to be relatively large. However, when setting the elasticity of restitution to be too large, a vibration is generated with respect to the transfer belt 66, and a judder by the cleaning blade 119*a* or a stick slip is generated, thereby causing an unevenness of the speed of the transfer belt 66. In the present embodiment, a hardness of the cleaning blade 119*a* is set to 68 degrees to 75 degrees, a Young's modulus is set to 60 to 80 ($\mathrm{Kg/cm^2}$) and an elasticity of restitution is set to 35 to 55% (at a room temperature). It is possible to obtain an excellent cleaning performance by using the cleaning blade 119*a*.

As shown in FIGS. 4 and 5, the recovery apparatus mentioned above for recovering the toner scraped away from the surface of the transfer belt 66 is provided in the lower portion of the cleaning blade 119*a*. The recovery apparatus has a cleaner case 119*b* for receiving the waste toner, and an auger 151 for conveying the waste toner from the front side of the apparatus to the rear side is provided within the cleaner case 119*b*.

The waste toner within the cleaner case 119*b* is conveyed to a discharge port 156*b* provided in the rear side due to a rotation of the auger 151 so as to be dropped down to a waste toner feeding pipe (not shown) in the side of the apparatus main body 1. Bushes 152 are provided at both ends of the auger 151. When employing a material such as GCB and the like for the bushes 152, an impregnated oil and the toner are adhered within the bush and there is a possibility that the rotation of the auger 151 is locked. Accordingly, a resin material which is congenial with the toner component is employed for the material of the bush 152.

A gear 153 is provided at an end portion in a front side of the auger 151, and a gear 154 provided at the end portion 108*a* in the front side of the rotary shaft 108 of the drive roller 62 is meshed with the gear 153. Accordingly, the rotational drive force of the drive roller 62 is transmitted to the auger 151 via the gear 154 and the gear 153, and the auger 151 is rotated in correspondence to the rotation of the drive roller 62. That is, the auger 151 is driven by the drive roller 62.

As mentioned above, in the case that the drive roller 62 is set to be the drive source for the auger 151, a change of rotation is generated in the drive roller 62 due to the poor rotation of the auger 151, so that there is a possibility of giving a bad influence to the image, however, in the case of the present embodiment, since it is considered that an amount of the waste toner recovered from the transfer belt 66 is one some times of an amount of the waste toner of the non-transferred toner on the photosensitive drum, it is considered that there is hardly generated a load change of the auger 151 caused by the change of the amount of the waste toner.

Here, a description will be given of a method of determining the number of rotation of the auger 151 and the number of teeth of the gear 153 which do not give a bad influence to the image. The number of rotation and the number of the teeth are determined on the basis of a graph in FIG. 14.

In FIG. 14, a curve expresses a visual sensitivity characteristic, a horizontal axis indicates a resolution DPI (dot/inch) and a vertical axis indicates a gradient. A hatched portion in the graph is an area which human can recognize. As is understood from the graph, 200 gradations can be recognized near 50 DPI. This means that since the relationship 50 DPI=0.5 mm pitch is established, unevenness of the pitch having this pitch on the image can be easily recognized by the human. Further, to the contrary, since the area outside the hatched portion in the graph is hard to be recognized, it can be the that the image trouble is inconspicuous in this area.

Accordingly, it is a question how the border line is set, however, taking an experience such as an image estimation and the like into consideration, it is known that the human eye can hardly recognize when setting the low frequency side to 10 DPI (2.54 mm pitch) or less and the high frequency side to 200 DPI (0.127 mm pitch) or more.

That is, in the case of defining the number of rotation of the auger 151 and the number of the teeth of the gear 153 in setting the drive roller 62 to the drive source, the unevenness of the image pitch (the image jitter) is inconspicuous if setting the vibration frequency per one teeth to the frequency band mentioned above, so that no problem is generated.

Generally, in the case of setting the number of rotation of the drive source to DI (rpm), the gear GI of the drive source to a module m and the number of teeth to N1, the number of rotation of the auger 151 to D2 (rpm) and the gear G2 of the auger to a module m and the number of teeth to N2, the following formula is established.

$$D2=D1\times(N2/N1)\ (\text{rpm}) \tag{9}$$

When setting the frequency per one tooth of the auger to f2, the following formula is established.

$$f2=1/(D2\times N2\times(1/m)\times(1/60))=60m/(D2\times N2) \tag{10}$$

When setting the conveying speed of the transfer belt 66 to r (mm/sec), the pitch P on the image is obtained by the following formula.

$$P=r\times f2(\text{mm}),\ f2=P/r \tag{11}$$

In an actual considering method, since D2 and N2 are values to be determined, the following formula is established according to the formulas (10) and (11).

$$D2\times N2=(60m\times r)/P \tag{12}$$

Further, the following formula is established according to the formulas (12) and (9).

$$N2=\sqrt{(60\text{m}\times r\times N1)/(P\times D1)} \tag{13}$$

In this case, since N2 calculated here is not an integral number, it is set to an integral number close to the value.

That is, when determining the image pitch P at first, the number of the teeth of the gear 153 in the auger 151 is determined.

In the present embodiment, when determining P=4.7, D1=102 (rpm) and N1=23 at first, N2=19.1 is established according to the formula (13), so that the number of the teeth of the gear 153 can be set to 19.

In the case that the transfer belt unit 61 is taken out from the table unit 91, the discharge port **156*b* mentioned above with respect to the waste toner feeding pipe in the side of the apparatus main body 1 is closed. That is, if the discharge port 156*b* is kept open, the toner drops while moving the transfer belt unit 61, so that there is a risk of soiling the inner portion of the machine, the user's hand, the clothes and the like. In order to prevent the toner from dropping in the manner mentioned above, a shutter 157 is arranged in the discharge port 156*b* of the cleaner case 119*b* as shown in FIG. 5**.

The shutter 157 is urged to the side of being closed by the spring 159. The structure is made such that when the table unit 91 mounting the transfer belt unit 61 is pulled out from the apparatus main body 1, the shutter 157 is automatically closed due to the urging force of the spring 159. Further, the structure is made such that when the table unit 91 is inserted into the apparatus main body 1, the portion of the shutter 157 is fitted to the waste toner feeding pipe in the side of the apparatus main body 1 and the shutter 157 is opened. The fitting portion in the side of the waste toner feeding pipe is sealed by a seal member, for example, an urethane foam of an ether group and the like, whereby a leakage of the waste toner can be prevented.

Further, as shown in FIG. 5, two side seals **119*c* for preventing the toner from scattering are adhered to the cleaner case 119*b*. These side seals 119*c* are formed by the urethane foam of the ether group, and it is preferable to set a density thereof to 25 $kg/m^3$ or less and a hardness thereof to 13 [ ] or less. If the hardness and the density of the seal member is large, a load is applied to the transfer belt 66** and a zigzag motion control is affected, so that the material requires a relatively soft foaming density at a degree that the toner does not move therethrough in addition to the characteristics mentioned above.

Further, in the same manner, a recovery blade **119*d* for preventing the toner from scattering is adhered to the cleaner case 119*b* (refer to FIG. 4). By bringing the recovery blade 119*d* into light contact with the drive roller 62, the toner is prevented from scattering when scraping the toner by means of the cleaning blade 119*a* or when conveying the toner by means of the auger 151. The urethane rubber group is employed for the material of the recovery blade 119*d***. A polyester film may be employed as far as the service life and the function can be obtained.

In the case of the copying machine 1, it is difficult to calculate the amount of the waste toner on the transfer belt 66, for example, in the case that the paper clogging is generated at a time of printing a rush image, a most amount of the rush portion is generated as the non-transformed toner. Further, since it can not be known how many times the paper clogging is generated during the service life of the transfer belt unit 61, as in the present embodiment, it is necessary to convey the waste toner by means of the auger 151 with considering a safety so as to feed to the waste toner feeding pipe in the apparatus main body 1.

However, in the case of the printer, since the data translation is shut when the paper clogging is generated, there is no possibility that the rush image becomes the non-transferred toner. That is, in the case of the printer, the auger 151, means for driving it and the like are not required in the cleaner case **119*b*, so that it is possible to set a size of the cleaner case 119*b* to a volume corresponding to a total amount of the waste toner generated during the service life of the transfer belt unit 61. By employing this system, as well as a down time of the machine is shortened, a mechanism of a waste toner receiving portion in the unit is simplified, so that it is possible to reduce a cost. Further, since the fitting portion to the side of the main body is not required, there is an advantage that the toner is not scattered when attaching and detaching the transfer belt unit 61 with respect to the table unit 91 or when taking out the table unit 91 from the apparatus main body 1**.

Next, a description will be given of a new/old detecting mechanism for the transfer belt unit 61.

As mentioned above, the transfer belt unit 61 according to the present invention is designed so as to be taken out from the apparatus main body 1 so as to be easily replaced by the user. Accordingly, it is necessary for the user to control the service life of the transfer belt unit 61. That is, there is required a new/old detecting mechanism for judging whether or not a new transfer belt unit 61 to be mounted to the apparatus main body 1 is new. As mentioned above, since the newly mounted transfer belt unit 61 is detected whether new or old it is, it is possible to prevent the old transfer belt unit 61 which was once used from being again used, and it is possible to prevent the transfer belt unit 61 from being used for a too long time.

As shown in FIG. 6, a new/old detecting unit 180 for detecting new or old of the transfer belt unit 61 is mounted to the belt frame 101 in the front side of the transfer belt unit 61. That is, since the power supply portion 140*a* of the transfer roller 68 is arranged in the belt frame 105 in the rear side of the transfer belt unit 61 as mentioned above, a high voltage cable for supplying a power to the transfer roller 68 and a signal line for detecting new or old are brought into contact with each other when arranging the new/old detecting unit 180 in the belt frame 105 in the rear side, so that there is a possibility that an erroneous operation is caused by a noise due to a high voltage or the like. Accordingly, the new/old detecting unit 180 is arranged in the front side which is opposed to the power supply portion 140*a* of the transfer roller 68.

The new/old detecting unit 180 detects the fact that the new transfer belt unit 61 is mounted, by cutting a fuse.

As shown in FIG. 15A, the new/old detecting unit 180 has a base plate 181, and the base plate 181 is fastened and fixed to the case 180*a* by means of screws or plastic rivets. The case 180*a* is linked over and fixed to both of the belt frames 160LF and 160RF in the front side which is formed so as to freely rotate as shown in FIG. 13. That is, the case 180*a* is fixed to the bent portion of the belt frame straightly extended as shown in FIG. 12 after the transfer belt 66 is tensioned to the drive roller 62 and the driven roller 64 supported to the belt frames 101 and 105. The case 180*a* of the new/old detecting unit 180 also serves as a temporary fastening member for the belt frames 101 and 105 before mounting the stays 162 and 163 mentioned above.

Further, it is possible to make the force applied to the respective link portions 120*a* of the lift-up mechanism 120 uniform by mounting the new/old detecting unit 180 to the bent portion of the belt frame 101 and arranging the unit 180 substantially at a center of two fitting portions with respect to the lift-up mechanism 120 mentioned below. Accordingly, a force for pressing down the transfer belt unit 61 can be uniformly dispersed to the respective link portions 120*a* and it is possible to prevent a bad influence to the process unit 51 as much as possible.

As shown in FIG. 15B, two conductive portions of the base plate 181 are provided as shown by a hatched portion. FIG. 15A shows a state that the new/old detecting unit 180 is under a conductive state, in a state that the transfer belt unit 61 is inserted along the guides 200 and 201 of the table unit 91. At this time, a conductive spring 183 is brought into contact with one of the conductive portions of the base plate 181 so as to be conducted. When the power source is turned on after mounting the transfer belt unit 61 to the table unit so as to insert into the apparatus main body 1, a fuse 185 under a conductive state via the conductive spring 183 is broken, so that it is judged that the transfer belt unit 61 is a new unit.

A service life control of the transfer belt unit 61 is started at this time, and a life count is started till a predetermined service life. When the transfer belt unit 61 comes near the service life thereof, an indication “Near Life” is displayed and an indication “replacement of belt unit” is displayed at a time of reaching the service life. Since a lot of disadvantages are given to the user when automatically stopping the copying machine 1 at a time of generating these alarms, only the display for showing the replacement is performed without stopping the apparatus main body 1. Accordingly, the user can replace the transfer belt unit 61 reaching the service life at a suitable timing.

As mentioned above, by setting the service life of the transfer belt unit 61, that is, the transfer belt 66 and the transfer rollers 68 assembled in this unit so as to treat as expendable supplies, the transfer belt 66 and the transfer roller 68 are not used for an unnecessarily long time as is different from the conventional transfer mechanism, so that it is possible to maintain an image having a high quality and a high precise.

In this case, as another method of detecting the new/old mentioned above, there can be considered a method according to a mechanical system. This system is structured such that a gear is rotated by driving a rotary portion and an actuator having a screw portion operates a switch or the like due to a force of rotation. In the case of employing this mechanism in the present embodiment, since the drive roller 62 is used for driving the auger for conveying the waste toner and the driven roller 64 is urged by the spring, the mechanism can not be arranged near a straight line which connects the drive roller 62 to the driven roller 64. It is possible to arrange the mechanism near a line which passes a center of the driven roller 64 on design and is perpendicular to the straight line connecting between the drive roller 62 and the driven roller 64 (not shown).

Figure 16:
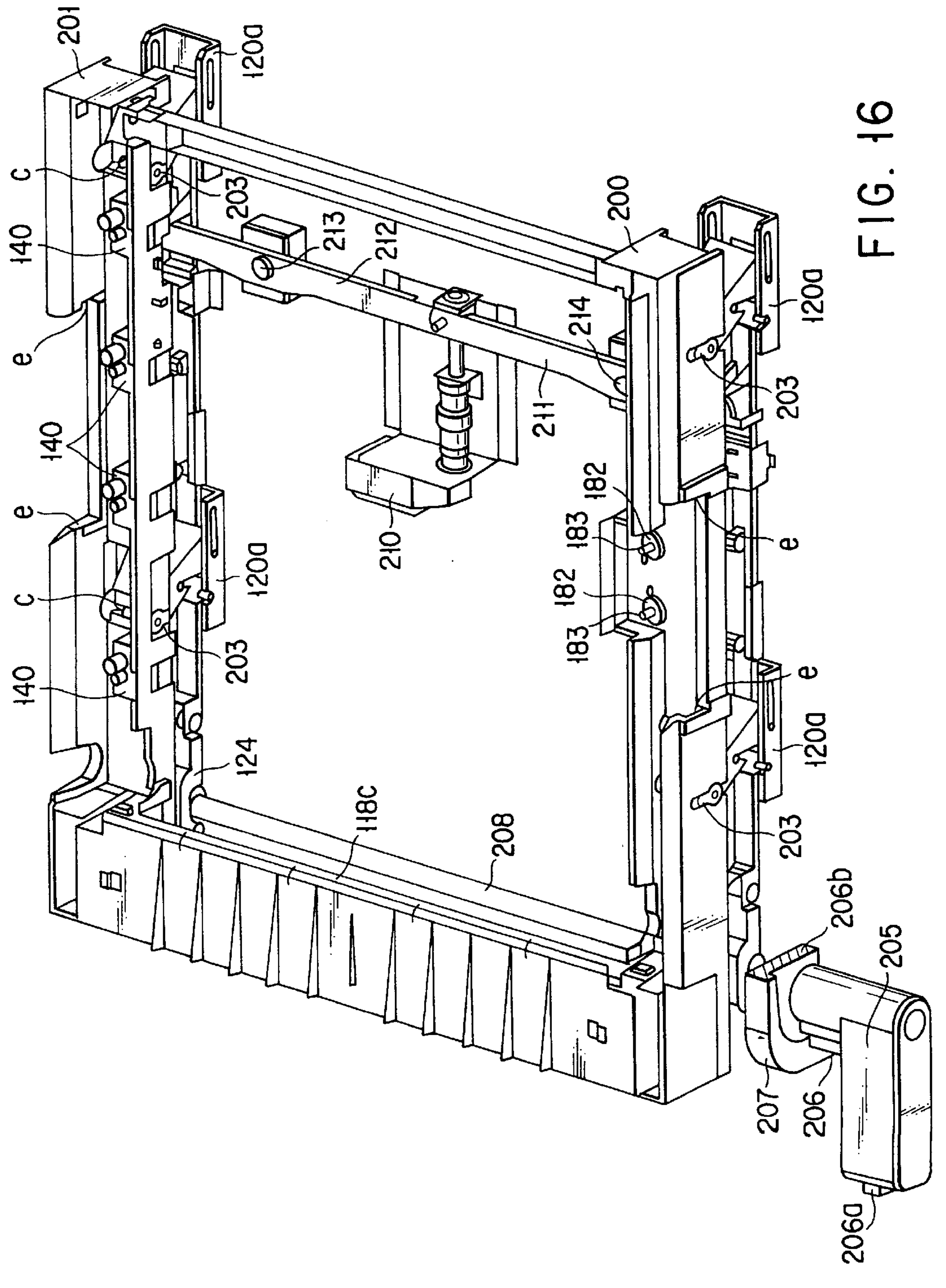
FIG. 16 is a perspective view showing a table unit for setting the transfer belt unit, which is provided so as to be taken out from the front side of the main body of the apparatus.

As shown in FIG. 16, a conductive portion of the new/old detecting unit 180 is provided at a substantially center position of the guide 200 disposed in the front side of the table unit 91. Here, an illustration is given of a state that the conductive spring 183 projects from the protecting cover 182, and the projecting conductive spring 183 can be brought into contact with the base plate 181 in the side of the transfer belt unit 61.

Figure 17:
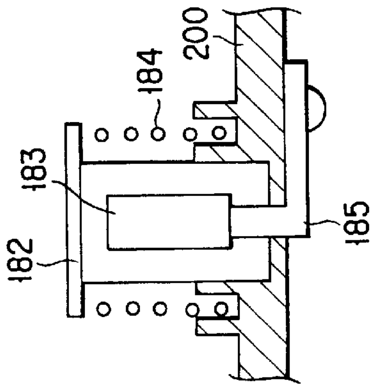
FIG. 17 is a cross sectional view showing a structure of a power supply portion for supplying a power to the transfer roller of the transfer belt unit, which is provided in a side of the table unit.

As shown in FIG. 17, the protecting cover 182 for the conductive portion is generally urged upward by the spring 184, and covers the conductive spring 183 so that the user's hand is not in contact with the conductive spring 183 when the transfer belt unit 61 is taken out from the table unit 91. This conductive spring 183 is screwed into the holder 185 and securely under a conductive state. One of the holders 185 is connected to a connector 250 (refer to FIG. 19) for connecting to the apparatus main body 1, another thereof is a harness with a round terminal, and the round terminal and the holder 185 are commonly fastened with the guide 200.

In the case of assembling the transfer belt unit 61, the transfer belt 66 is wound around the drive roller 62 and the driven roller 64 so as to be attached thereto, the cleaning apparatus 111 and the new/old detecting unit 180 is mounted at a predetermined position, and thereafter, the frame covers 101*a* and 105*a* serving as the cover and the handle are respectively mounted to the belt frames 101 and 105 in the front side and the rear side. Details of the frame covers 101$a$ and 105$a$ are representatively shown in FIG. 18 with respect to the frame cover 101$a$ in the front side. In this case, there is shown a perspective view in the case of viewing the frame cover 101$a$ in the front side from the inner side thereof.

The transfer belt unit 61 is kept rotatable before mounting the frame covers 101$a$ and 105$a$. Accordingly, these frame covers 101$a$ and 105$a$ also serve to fix so that the belt frames 101 and 105 of the transfer belt unit 61 can not rotate. That is, the frames 160LF and 160RF can not rotate by fitting projections 101$b$ of the frame cover 101$a$ shown in FIG. 18 into holes 160$a$ of the respective frames 160LF and 160RF shown in FIG. 11. Then, the frame cover 101$a$ is screwed and fixed to the frames 160LF and 160RF via screw holes 101$c$ of the frame cover 101$a$.

Figure 18:
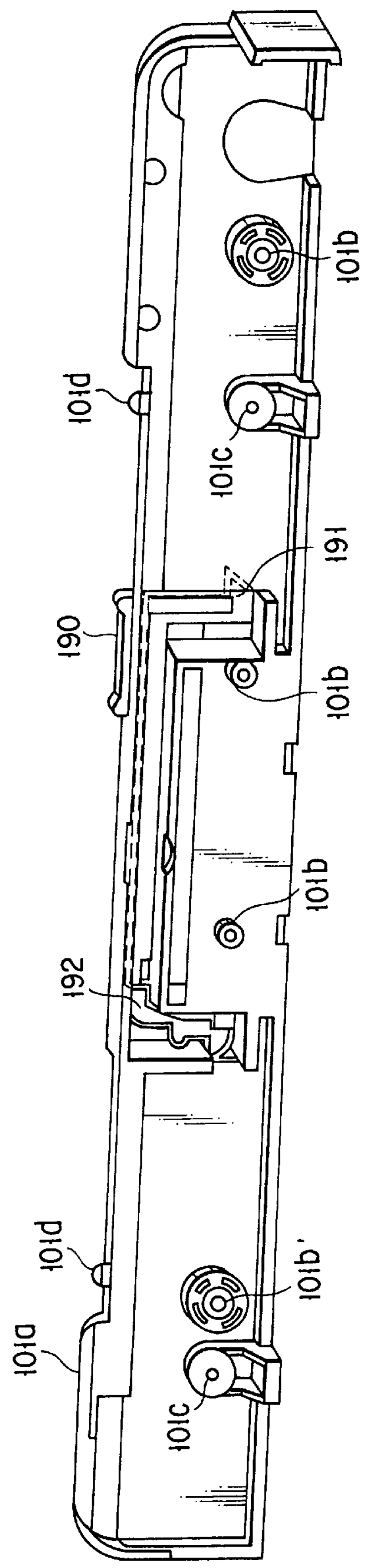
FIG. 18 is a perspective view as seen from an inner side of a frame cover showing the frame cover mounted to a belt frame in the front side of the transfer belt unit.

Further, the positioning of the transfer belt unit 61 with respect to the process unit 51 including the photosensitive drum 11 is performed by the projections 101$d$ (105$d$) of the frame covers 101$a$ (105$a$) shown in FIGS. 3A and 18. Further, a recess portion c corresponding to a standard for lifting up the transfer belt unit 61 is provided in the lower end side of the belt frames 101 (105). The recess portion c is illustrated in FIG. 6, and is formed, for example, in a spherical recess portion.

Then, the transfer belt unit 61 is mounted to the table unit 91 along the guides 200 and 201, the table unit 91 is inserted into the apparatus main body 1, and thereafter, a handle 205 of the lift-up mechanism 120 shown in FIG. 16 is rotated in a counterclockwise direction while pressing a push button 206$a$. FIG. 16 shows a state after rotating the handle 205. When rotating the handle 205 in a counterclockwise direction, a shaft 208 provided in the center of rotation of the handle 205 is rotated, and a portion 206$b$ is rotated along a guide 207 from a certain position. When the handle 205 is at a horizontal position, a lock state is established as shown in FIG. 16.

Figure 19:
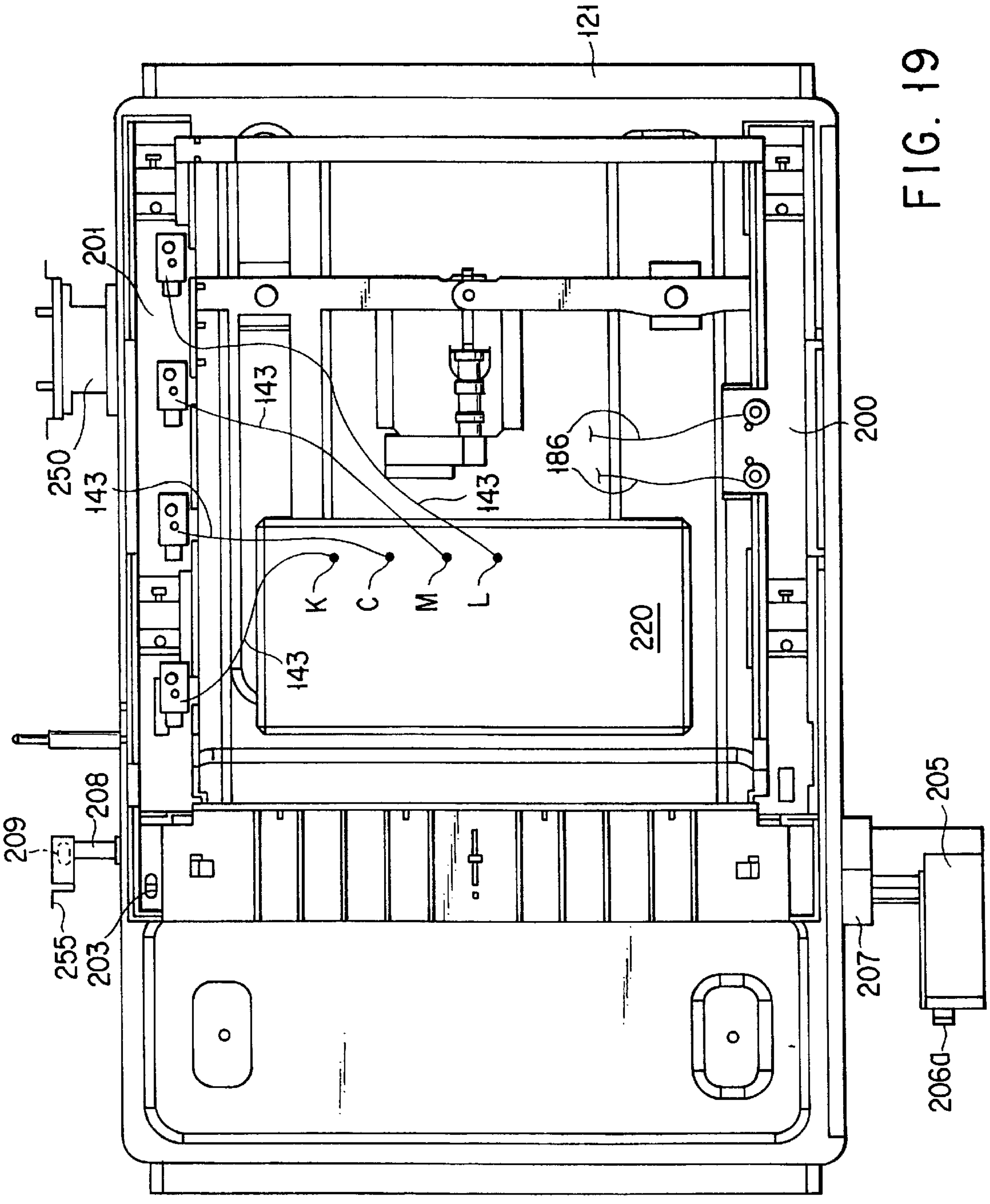
FIG. 19 is a plan view showing a table unit in FIG. 16.

At this time, as shown in FIG. 19, a stopper portion 209 provided in a front end of the shaft 208 is fitted to a sheet metal member 255. In this state, that is, in the state that the transfer belt unit 61 is lifted up toward the process unit 51 so as to be positioned, the handle 205 is locked even when it is intended to pull the handle 205 to the front side so as to take out the transfer belt unit 61. Further, in the state of taking out a take out frame 121 (refer to FIG. 4) of the table unit 91 from the apparatus main body 1, since a hatched portion 206$b$ shown in FIG. 16 collides therewith and it is impossible to lift up the transfer belt unit 61 even when rotating the handle 205, the user's hand is not caught between the guide 200 and the take out frame 121.

Next, a description will be given of a lift-up mechanism 120 for lifting up the transfer belt unit 61 toward the process unit 51 with reference to FIGS. 16, 20, 21, 22A, 22B, 23A and 23B.

Figure 20:
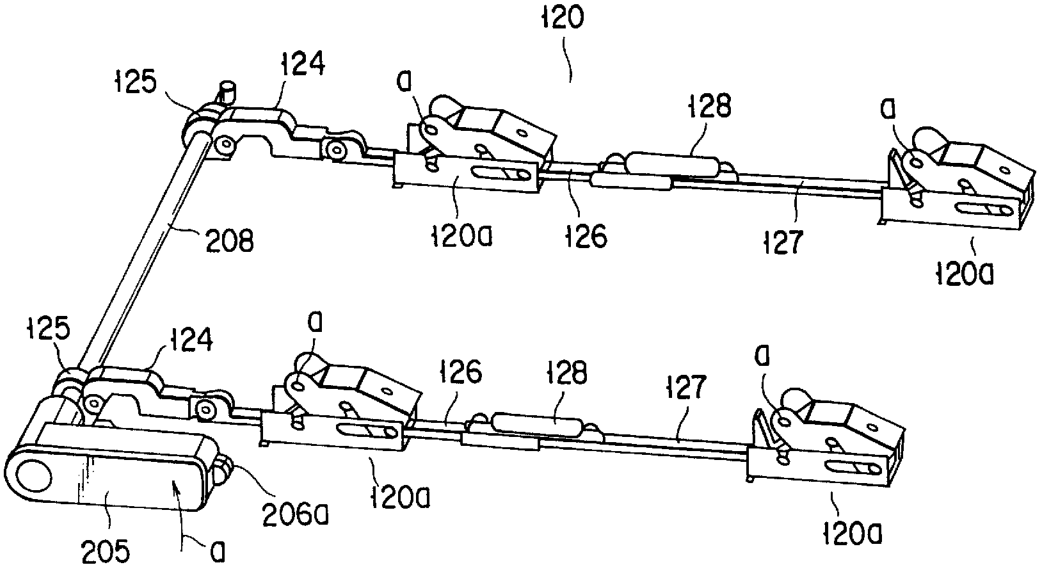
FIG. 20 is a perspective view showing a lift-up mechanism for lifting up the transfer belt unit toward a process unit.
Figure 21:
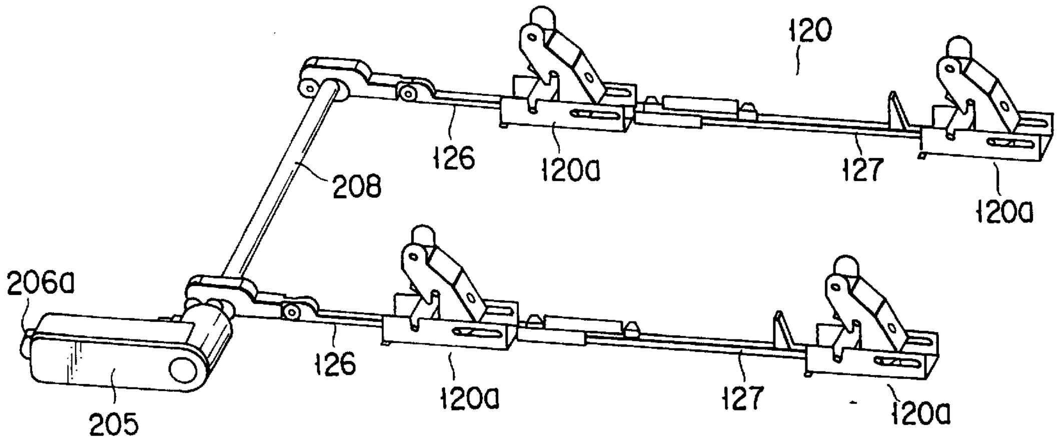
FIG. 21 is a perspective view showing a state that the lift-up mechanism in FIG. 20 lifts up the transfer belt unit.

FIGS. 20 and 21 are perspective views of the lift-up mechanism 120 arranged on the take out frame 121 of the table unit 91. The lift-up mechanism 120 and the guides 200 and 201 are connected to each other by fitting members 203 in the side of the lift-up mechanism 120 shown in FIG. 16 to the guides 200 and 201. When changing attitudes of four link portions 120$a$ mentioned below of the lift-up mechanism 120, the guides 200 and 201 are vertically moved. FIGS. 20 and 21 show a state of changing the attitudes of the respective link portions 120$a$.

A shaft 208 extending from the front side of the apparatus to the rear side is fixed to the handle 205 for changing the attitudes of four link portions 120$a$. Cams 125 are respectively fixed to portions near both ends of the shaft 208. When rotating the handle 205, the shaft 208 and the cams 125 rotate in an interlinking manner. Lock members 124 are rotatably connected to the respective cams 125.

Four link portions 120$a$ are connected to two lock members 124 via a plurality of rod members 126 and 127. The rod members 126 and 127 connected to the respective lock members 124 are connected to each other via springs 128.

As shown in FIG. 21, when rotating the handle 205 from a state shown in FIG. 20 in a direction of an arrow a at 180 degrees, four link portions 120$a$ are changed to the attitude for lifting up the transfer belt unit 61. In the present embodiment, the transfer belt unit 61 is lifted up at 25 mm by the lift-up mechanism 120. At this time, when rotating the handle 205, the front ends of the lock members 124 are lifted up due to an operation of the cams 125 and come over the shaft 208. When the handle 205 is rotated at 180 degrees, the attitudes of the link portions 120$a$ are changed from a state shown in FIG. 22B to a state shown in FIG. 22A.

Figure 23A:
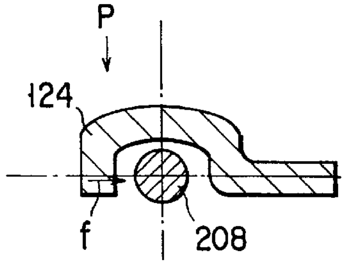
FIG. 23A is a schematic view for explaining an operation of a lock member of the lift-up mechanism in FIG. 20.
Figure 22B:
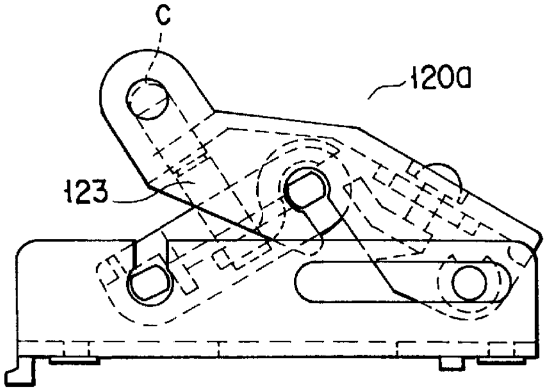
FIG. 22B is a schematic view showing a detailed structure of a link portion of the lift-up mechanism under a state shown in FIG. 20.

As shown in FIG. 23A, the lock member 124 of the present embodiment is structured such that a lowermost position of the front end portion of the lock member 124 coming over the shaft 208 is positioned near a horizontal line passing through the center of the shaft 208 or below the position. By making the structure in this manner, when a force from the upper portion is applied, no force is applied in a direction that the attitude of the link portion 120$a$ moves downward. Further, if the force of returning the handle 205 is served, the attitude of the link portion 120$a$ is not changed.

When the respective link portions 120$a$ are operated, the rotating force of the handle 205 is directly transmitted to the cams 125 and the lock members 124 move in a horizontal direction while lifting up due to the rotational force. Accordingly, it is possible to reduce a loss of the force for changing the attitudes of the link portions 120$a$.

Figure 23B:
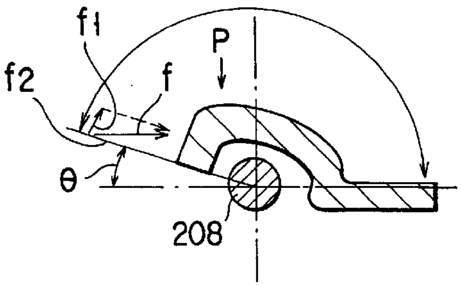
FIG. 23B is a schematic view showing a comparative embodiment of the lock member.

However, as shown in FIG. 23B, in the case that the front ends of the lock members 124 coming over the shaft 208 are positioned above a horizontal line passing through the center of the shaft 208 and the angle is about 135 degrees, if the lock members 124 are insufficiently engaged with the shaft 208, there is a possibility that the link portions 120$a$ are pressed down due to an external force. In this case, there is generated a disadvantage that the link portions 120$a$ move downward due to some impact as well as a contact state between the process unit 51 and the transfer belt unit 61 becomes unstable.

To the contrary, the lock mechanisms for the link portions 120$a$ are not required by positioning the front end of the lock members 124 below the horizontal line as shown in FIG. 23A.

Further, it is possible to employ a plurality of links for the link lift-up mechanism comprising the cam 125 and the lock member 124, however, in the case of using a plurality of links, since a direction of the force applied by the handle is different from a direction to which the link is desired to be moved, a loss of the force is generated. Accordingly, the link must be made of a strong member because there is a possibility that a connecting portion of the link is broken due to an excessive force. Further, there is a case that it is hard to manually operate the handle because more force is applied to the handle 205 due to the loss of the force. Accordingly, it is necessary to reduce speed by using the gear so as to assist a rotation of the handle 205, and it is necessary to increase a width of tooth in the case that the gear is a mold type because a force is also applied to the gear. Further, in the case of the mold type and being broken, it is necessary to employ a metal and a cost increase is involved. Further, it is hard that the lock members 124 move over the shaft 208 by using a plurality of links, and if they move over it, an angle to the front ends of the lock members 124 is limited to about 120 degrees, and when it over the angle, the links interfere with the shaft. Accordingly, it is necessary to make the locking mechanism strong, a cost is increased.

Next, a description will be given of a method of positioning the transfer belt unit 61 to the lift-up mechanism 120.

The transfer belt unit 61 is inserted into the table unit 91 along the guides 200 and 201 when the table unit 91 is taken out from the apparatus main body 1 and the respective link portions 120*a* of the lift-up mechanism 120 are in the descended attitude shown in FIG. 20. At this time, the respective link portions 120*a* are in the state shown in FIG. 22B, and front end portions c of positioning members 123 of the respective link portions 120*a* are not in contact with the recess portions c (refer to FIG. 6) disposed in the lower ends of the belt frames 101 and 105.

Figure 22A:
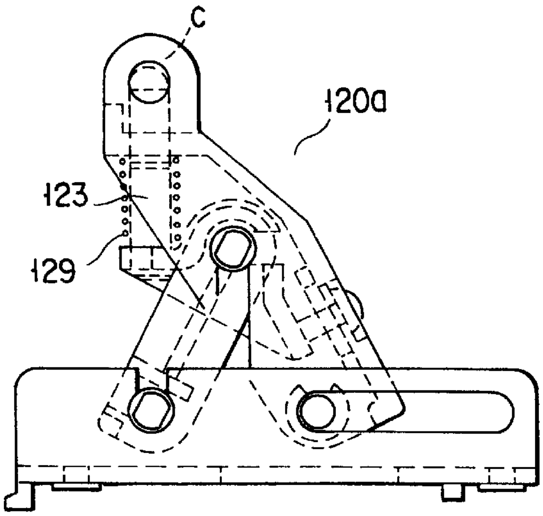
FIG. 22A is a schematic view showing a detailed structure of a link portion of the lift-up mechanism under a state shown in FIG. 21.

When rotating the handle 205 from this state so as to lift up the respective link portions 120*a* to an attitude shown in FIG. 22A, the positioning members 123 of the link portions 120*a* stand up and the front end portions thereof are engaged with the recess portions c of the belt frames 101 and 105, so that the belt frames 101 and 105 are lifted up.

Accordingly, the link portions 120*a* and the transfer belt unit 61 are positioned, and at the same time, the positioning projections 101*d* and 105*d* in the frame covers 101*a* and 105*a* of the transfer belt unit 61 are fitted to the positioning portions in the side of the process unit 51. Therefore, the transfer belt unit 61 is positioned to the process unit 51.

That is, means for positioning the transfer belt unit 61 to the apparatus main body 1 include the table unit 91 capable of being taken out from the apparatus main body 1, and the lift-up mechanism 120 arranged on the take out frame 121 of the table unit 91. Further, the projections 101*d* and 105*d* provided in the upper ends of the frame covers 101*a* and 105*a* in the transfer belt unit 61 are formed in a positional relationship in parallel to the front end portions c of the positioning members 123 in the lift-up mechanism 120 and are directly fitted to the process unit 51.

At this time, in order to absorb a position shift in a height direction of the process unit 51 and the like, springs 129 are mounted to the positioning members 123 of the respective link portions 120*a*. Accordingly, since the front end portions c of the respective positioning members 123 independently serve a damping function at four portions, it is possible to bring into contact with the process unit 51 with applying no load to the transfer belt unit 61.

Due to the lift-up mechanism 120 mentioned above, it is possible to move the transfer belt unit 61 in a substantially vertical direction. Accordingly, it is possible to secure a wide jamming treating space in both of upstream and downstream places of the transfer belt 66 at a time of treating the jamming, and in the case that it is hard to take out a jamming paper, it is possible to easily treat the jamming by descending the transfer belt unit 61 and taking out the table unit 91 from the apparatus main body 1.

Further, since the transfer belt unit 61 is designed on the assumption of being directly attached and detached by the user, a mechanism shown in FIG. 18 is provided in the frame covers 101*a* and 105*a* serving as the handle. In this case, the frame cover 101*a* in the front side will be representatively explained.

The frame cover 101*a* has pawl portions 191 and 192. The pawl portions 191 and 192 are fitted to portions e of the guides 200 and 201 in FIG. 16. When mounting the transfer belt unit 61 to the table unit 91, the transfer belt unit 61 is mounted and locked along inclined portions of the portions e. At a time of taking out the transfer belt unit 61 from the table unit 91, the pawl portions 191 and 192 are escaped in a predetermined direction by lifting a canceling mechanism 190 so as to be taken out from the guides 200 and 201.

The frame covers 101*a* and 105*a* press the bearings 150 disposed at both ends of the drive roller 62 so as to keep a strength of this portion.

Next, a description will be given of a function of fastening screws 109 and 110 of the cleaning apparatus 111.

As shown in FIG. 4, the peeling pawl 115 is brought into contact with the drive roller 62 of the transfer belt unit 61 via the transfer belt 66. The peeling pawl 115 is kept at a fixed load by a spring 115*a*. The peeling pawl 115 is made of a resin such as PPS and the like, and is separately provided from the transfer belt unit 61 for being replaced in correspondence to the service life of the apparatus main body 1 without being replaced in correspondence to the service life of the transfer belt unit 61.

Figure 24:
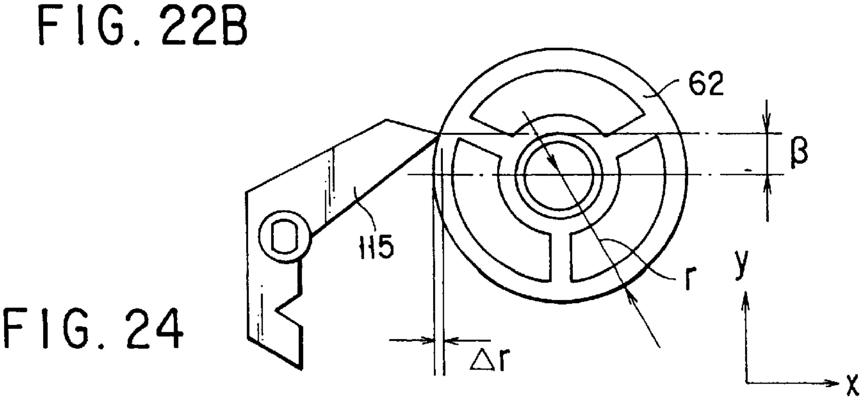
FIG. 24 is a schematic view showing a positional relationship of a peeling pawl with respect to the drive roller.

A positional relationship between the peeling pawl 115 and the drive roller 62 is in detail shown in FIG. 24.

When setting a radius of the drive roller 62 to r (mm), a distance between a front end of the peeling pawl 115 in the side that the peeling pawl 115 is brought into contact with the drive roller 62 and a center of the drive roller 62 along a height direction (y direction) to β (mm) and a distance at which the front end of the peeling pawl 115 enters the drive roller 62 along a horizontal direction (x direction) to Δr (mm), the following formula is obtained.

$$\Delta r = r - \sqrt{r^2 - \beta^2} \tag{14}$$

That is, when it is desired to insert the transfer belt unit 61 to the table unit 91 along the vertical direction (y direction), the front end of the peeling pawl 115 is interfered with the transfer belt unit 61 at a distance Δr. When inserting and taking out the transfer belt 61 in this state, a trouble is generated in the front end of the peeling pawl 115 or the transfer belt 66. For example, breaking of the peeling pawl 115, hurt of the transfer belt 66, rupture of the transfer belt 66 and the like are generated.

In order to prevent these troubles, it is necessary to retract the peeling pawl 115 in a direction (x direction) of moving apart from the drive roller 62 when attaching and detaching the transfer belt 61 with respect to the table unit 91. A distance Ad at which the peeling pawl 115 is retracted at that time is expressed by the following formula.

$$\Delta d = j^* \Delta r \tag{15}$$

In which j is a coefficient of safety.

In the present embodiment, since the radius of the driver roller 62 is r=12 (mm) and β=4 (mm), Δr=0.7 is established, and Δd=1.4 (mm) is established when setting the coefficient of safety j=2, so that when retracting the peeling pawl 115 along the x direction at about 1.4 (mm), no damage is applied to the transfer belt 66 and the peeling pawl 115.

Figure 25:
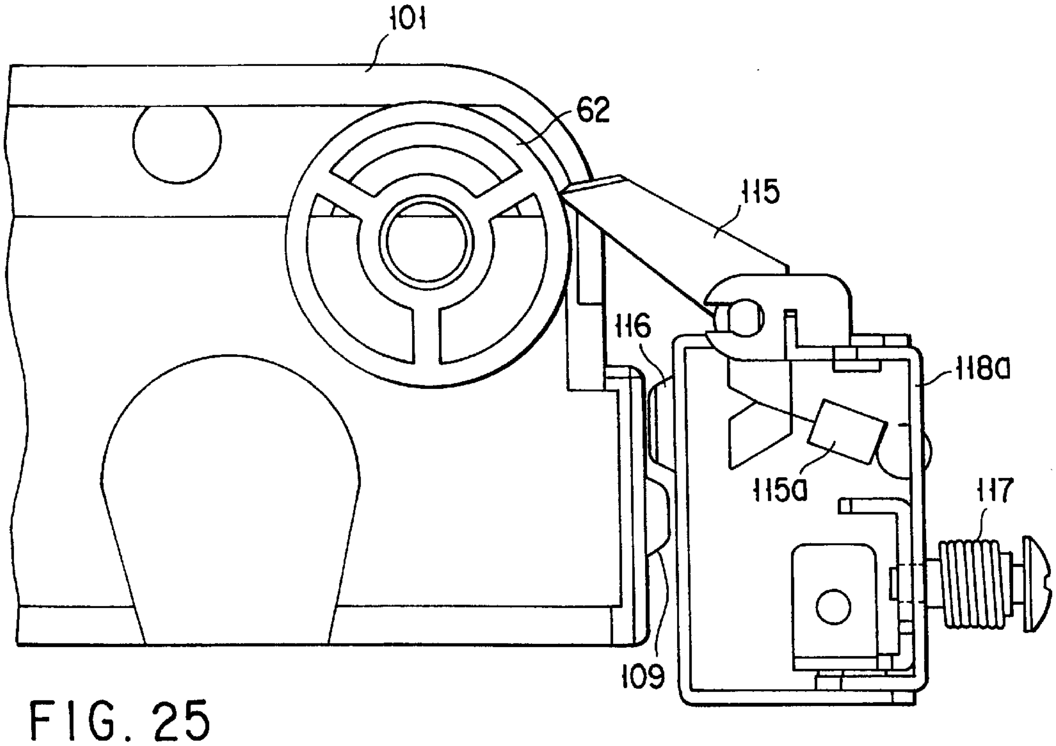
FIG. 25 is a schematic view as seen from a rear side of the apparatus showing a retracting mechanism of the peeling pawl in FIG. 24.

FIG. 25 is a schematic view of the retracting mechanism for the peeling pawl 115 as seen from the rear side of the apparatus.

When lifting upward the transfer belt unit 61 along the guides 200 and 201, the screw 109 of the cleaning apparatus 111 moves over a drawing portion 116 of the sheet metal. A peeling pawl holder 118*a* is fixed to a stay 118*b* fastened to a paper guide sheet metal 118*c* shown in FIG. 4 by a screw via a screw 117 with a spring. Accordingly, when the screw 109 of the cleaning apparatus 111 moves over the drawing portion 116 in the sheet metal, the peeling pawl holder 118a compresses the spring 117 and moves in a direction of an arrow c in FIG. 4. A moving distance at this time is dependent upon a height of the drawing portion 116 in the sheet metal.

Accordingly, since the peeling pawl 115 moves in a direction of an arrow c at a height of the drawing portion 116, the transfer belt 66 and the peeling pawl 115 are not injured when attaching and detaching the transfer belt unit 61.

Next, a description will be given of the table unit 91 mounting the transfer belt unit 61 with reference to FIGS. 4, 16 and 19.

A fixing device 71 is positioned on the take out frame 121 of the table unit 91 via a positioning pin 122. The take out frame 121 can be taken out in a horizontal direction with respect to the apparatus main body 1 and uses a rail and a roller (not shown) for the take out mechanism. The lift-up mechanism 120, the inserting guides 200 and 201, the peeling pawl retracting mechanism mounted to the inserting guide, the paper guide sheet metal 118*c,* the transfer biasing transformer 220 and the like mentioned above are arranged on the take out frame 121.

The paper guide sheet metal 118*c* serves as a peeling plate for peeling the paper adhered on the transfer belt 66. Accordingly, since the paper guide sheet metal 118*c* should be grounded, it is commonly fastened to the guide 201 by a FG line having a round terminal at one side.

Here, in the case of a general black copy, in order to stop the photosensitive drums 11*a* to 11*c* except that of a black color, two link portions 120*a* in the paper supply side among four link portions 120*a* in the lift-up mechanism 120 for lifting up the transfer belt unit 61 are moved downward, and the transfer belt unit 61 is tilted at about 1 degree. A motor 210 (FIG. 16) for moving away the belt is employed for a drive source for tilting the transfer belt unit 61.

The motor 210 for moving away the belt corresponds to a motor with a worm, and arms 211 and 212 move to the paper supply side around axes 213 and 214 as a center of rotation by rotating the motor. Accordingly, the attitudes of two link portions 120*a* in the paper supply side are changed from a state shown in FIG. 21 to a state shown in FIG. 20, and the transfer belt unit 61 is tilted at about 1 degree so that the end portion of the paper supply side of the transfer belt unit 61 moves downward.

The positioning member disposed between the process unit 51 and it is formed in a spherical shape for the reason of tilting the transfer belt unit 61.

The mechanical parts mentioned above are mounted on the take out frame 121. The take out frame 121 is mounted to the apparatus main body 1 via a slide rail arranged in a perpendicular direction to a forward moving direction of the paper and is structured such as to be freely taken out from the front side of the apparatus main body 1.

The transfer belt unit 61 is inserted along the inserting guides 200 and 201 of the take out frame 121 so as to lock the transfer belt unit 61 to the guides 200 and 201, and thereafter, mounted to the apparatus main body 1. At this time, the table unit 91 and the apparatus main body 1 are energized and grounded by a drawer connector 250 shown in FIG. 19.

Next, a description will be given in detail of a drive apparatus 300 of the transfer belt unit 61 according to the present invention.

Figure 26:
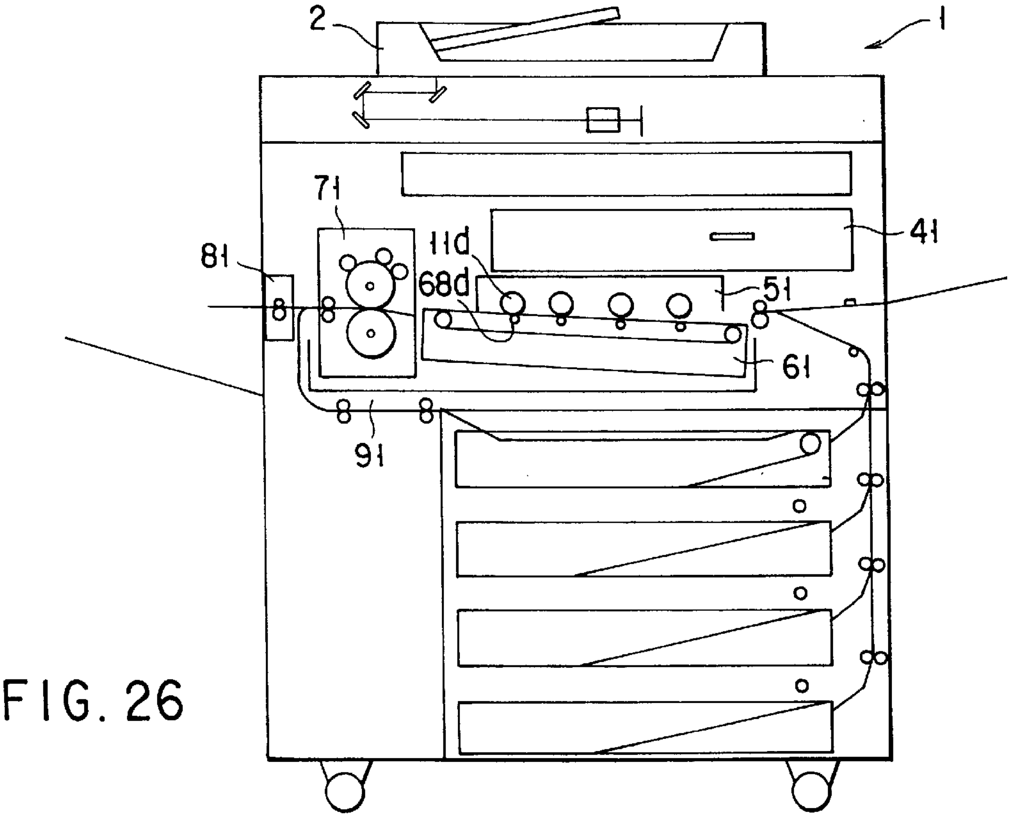
FIG. 26 is a schematic view showing a state of a black mode that the transfer belt unit is tilted to a second position.

In the case of making a black copy, as shown in FIG. 26, the transfer belt unit 61 is rotated around supporting point (not shown) provided vertically below the black photosensitive drum 11*d* in a counterclockwise direction by a drive mechanism (not shown). As mentioned above, it is possible to move the transfer belt 66 apart from the photosensitive drums 11*a,* 11*b* and 11*c* except the black one by tilting the transfer belt unit 61, whereby only a black copy can be made.

That is, the transfer belt unit 61 is arranged at three positions (1) to (3) mentioned below.

(1) First position most downward moved (2) Second position in a color mode (3) Third position in a black mode The present invention proposes a drive apparatus 300 mentioned below so as to securely transmit the drive force from the side of the apparatus main body 1 to the drive roller 62 in the transfer belt unit 61 whatever position among the positions (1) to (3) mentioned above the transfer belt unit 61 is set.

Figure 27:
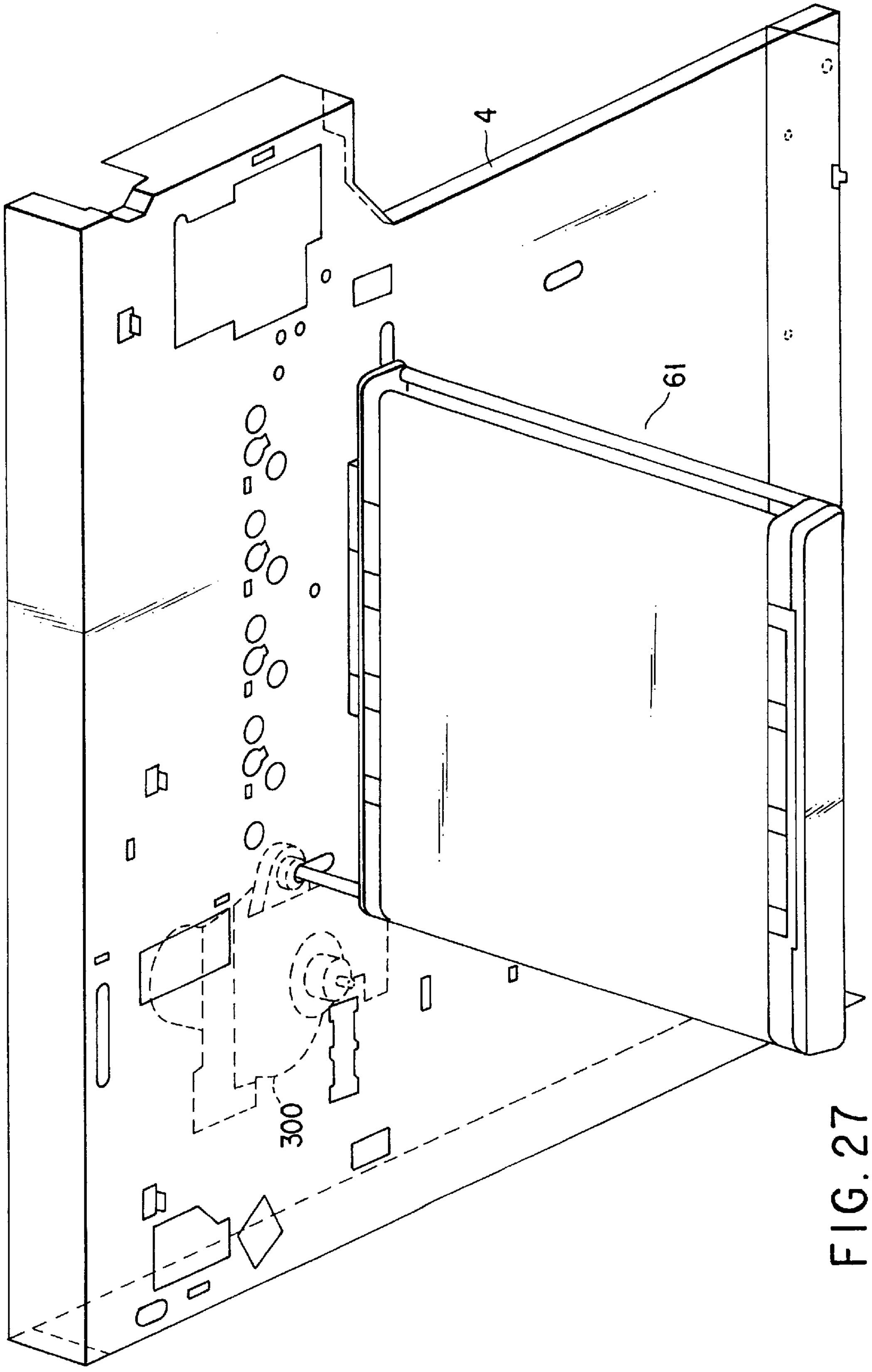
FIG. 27 is a schematic view showing a state of connecting the transfer belt unit to a transfer belt drive portion in the side of the main body of the apparatus.
Figure 28:
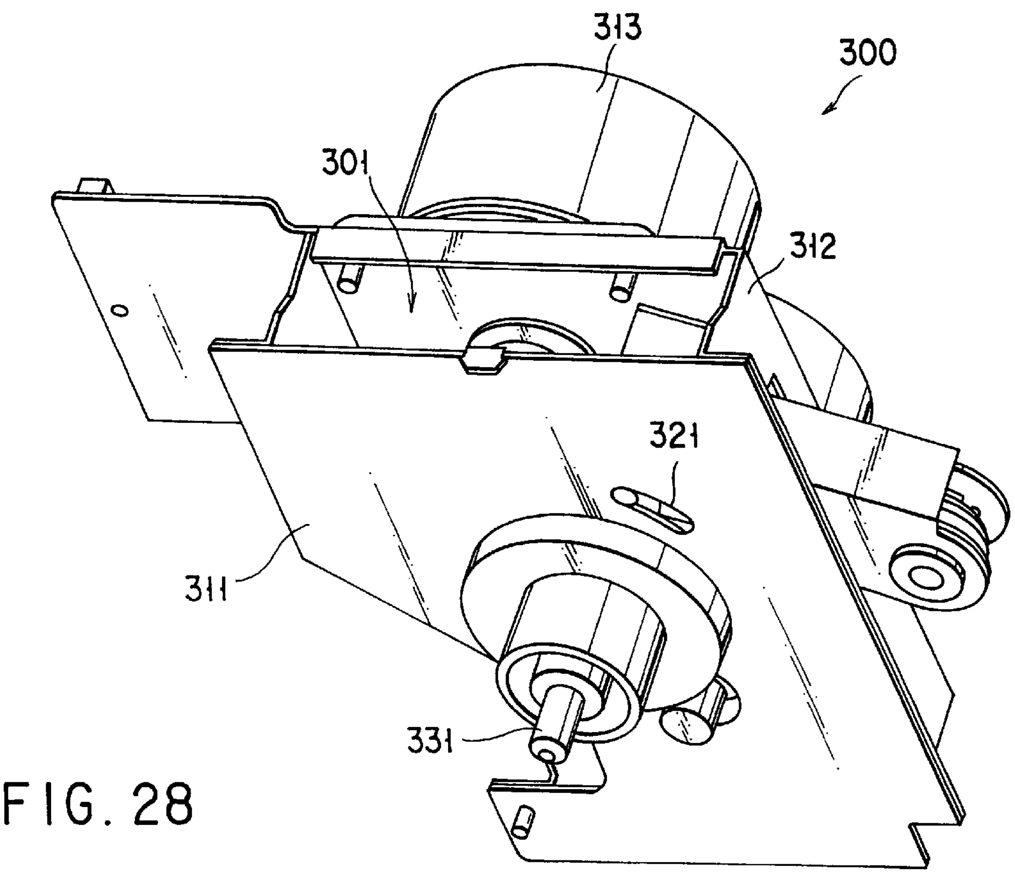
FIG. 28 is a perspective view showing the transfer belt drive portion in FIG. 27.
Figure 29:
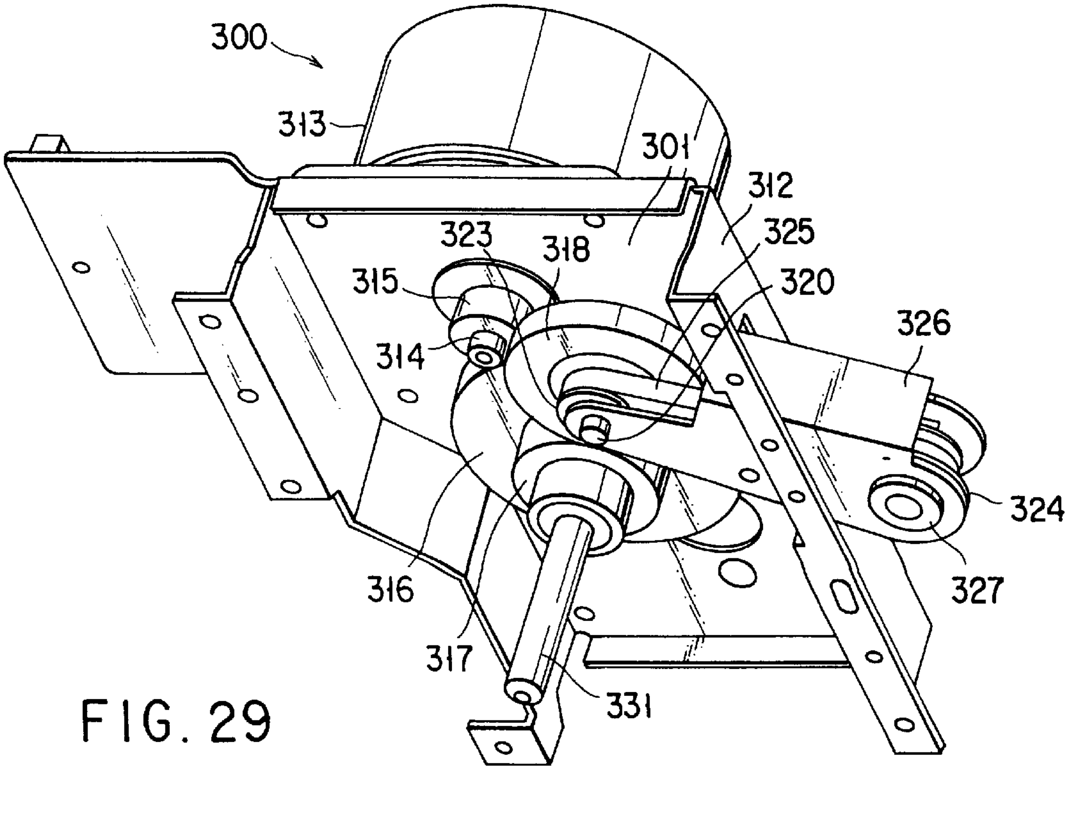
FIG. 29 is a perspective view showing a state of taking out a chassis in the front side of the transfer belt drive portion in FIG. 28.

FIG. 27 shows a connecting state between the transfer belt unit 61 and the drive apparatus 300 by a perspective view. The drive apparatus 300 is mounted to the frame 4 of the apparatus main body 1 in the rear side of the transfer belt unit 61. FIGS. 28 and 29 show the drive apparatus 300.

As shown in FIG. 28, the drive apparatus 300 has a chassises 311 and 312 which are combined in a box shape. A drive motor 313 is mounted to the chassis 312 in the rear side. A drive force transmitting mechanism 301 including gears, a timing belt and the like is provided between the chassises 311 and 312.

FIG. 29 shows a state of taking out the chassis 311 in the front side of the drive apparatus 300. A first gear 315 is mounted to a drive shaft 314 of the drive motor 313. A second gear 316 meshed with the first gear 315 is mounted to a stationary shaft 331 provided so as to connect the chassis 311 to the chassis 312. A third gear 317 is coaxially and integrally mounted to the second gear 316.

Further, a movable shaft 320 is provided between the chassises 311 and 312. A fourth gear 318 meshed with the third gear 317 is mounted to the movable shaft 320.

Both ends of the movable shaft 320 are fitted to oblong holes 321 (one of them is not illustrated) respectively provided in the chassises 311 and 312. These oblong holes 321 are formed in a circular arc shape around the stationary shaft 331. A width of the oblong hole 321 is slightly greater than a diameter of the movable shaft 320, so that the movable shaft 320 can move along the oblong hole 321.

A timing pulley 323 integrally formed with the fourth gear 318 is provided in the movable shaft 320. Further, one end of an arm 326 is rotatably mounted to the movable shaft 320. A timing pulley 324 is arranged at a swinging front end of the arm 326, and a timing belt 325 for transmitting the drive force is wound between the pulleys 323 and 324.

Figure 30A:
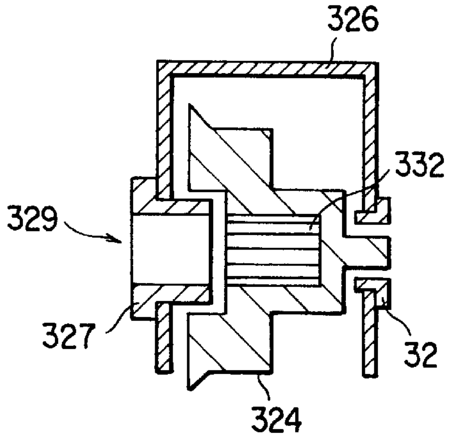
FIG. 30A is a cross sectional view showing a structure of a drive connecting portion for connecting the transfer belt drive portion in FIG. 28 to a spline in the side of the transfer belt unit.

FIG. 30A is a cross sectional view along an axial direction near the front end of the arm 326 provided with the timing pulley 324. The timing pulley 324 is rotatably mounted to the front end of the arm 326 via bearings 327 and 328.

Figure 30B:
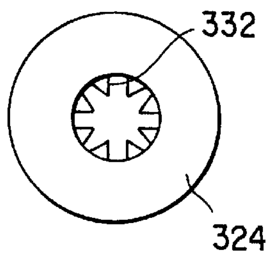
FIG. 30B is a front elevational view showing a timing pulley of the drive connecting portion in FIG. 30A.

Further, as shown in FIG. 30B, a hole 332 with a spline is provided in the timing pulley 324. The spline of the hole 332 has a shape which is meshed with the spline 65 provided in the rotary shaft 108 of the drive roller 62 in the transfer belt unit 61.

The spline in the side of the drive roller 62 is inserted into the hole 332 in the timing pulley 324 through the hole of the bearing 327 in the front side and meshed with the spline in the hole 332. Accordingly, the drive connecting portion is constituted.

Figure 31:
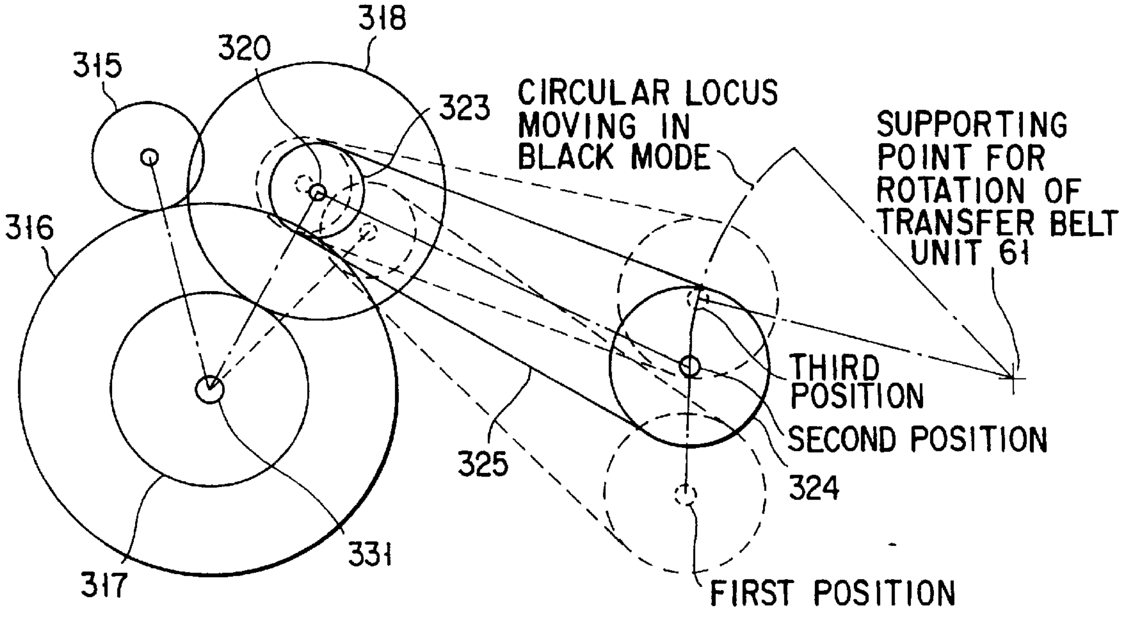
FIG. 31 is a schematic view for explaining an operation of the transfer belt drive portion when changing an attitude of the transfer belt unit.

FIG. 31 is a layout view for clarifying arrangement and motion of the drive apparatus 300 and the timing belt mentioned above. Hereinafter, an operation will be described with reference to this drawing.

When mounting the transfer belt unit 61 to the table unit 91 and pressing the table unit 91 to the apparatus main body 1, the spline 65 of the drive shaft 108 of the drive roller 62 in the transfer belt unit 61 is inserted into a drive connecting portion 329 of the drive apparatus 300. At this time, the spline in the drive shaft 108 and the spline in the drive connecting portion 329 are fitted to each other, so that the drive force can be transmitted without slipping. In this state, the transfer belt unit 61 is arranged at the first position mentioned above.

When rotating the handle 205 (refer to FIG. 2) of the lift-up mechanism 120 provided in the table unit 91 in a counterclockwise direction, the transfer belt unit 61 is lifted up by the lift-up mechanism 120 of the table unit 91 in a state that the drive shaft 108 of the transfer belt unit 61 is fitted to the drive connecting portion 329 of the drive apparatus 300. In this state, the transfer belt unit 61 is arranged at the second position mentioned above.

When the transfer belt unit 61 is lifted up to the second position, the front end of the arm 326 in the drive apparatus 300 also moves upward. At this time, if the movable shaft 320 corresponding to the supporting point of the arm 326 is fixed, the drive connecting portion 329 moves along a circular arc determined according to the length of the arm 326. In this case, since the drive connecting portion 329 moves along the circular arc mentioned above while the transfer belt unit 61 moves upward in a vertical direction, moving loci for both elements are different from each other, so that a motion of the transfer belt unit 61 is restricted. In the worst case, there is a possibility that the transfer belt unit 61 does not reach a designed position.

Therefore, according to the present invention, the structure is made such that the supporting point of the arm 326 is set to be movable and the drive connecting portion 329 can move in a vertical direction. Since the supporting point of the arm 326 is structured such as to rotate around the stationary shaft 331, a distance between the axes of the gears 317 and 318 is not changed, so that no trouble is generated in a drive transmission.

According to the structure mentioned above, the drive force from the motor 313 is securely transmitted to the timing pulley 324 via the shaft 314, the gears 315 and 316, the shaft 331, the gears 317 and 318, the timing pulley 323 and the timing belt 325, thereby rotating the drive shaft 108 of the drive roller 62 in the transfer belt unit 61 connected to the drive connecting portion 329 at a predetermined speed and moving the transfer belt 66 of the transfer belt unit 61 at a fixed speed.

Further, when tilting the transfer belt unit 61 to a black mode, the transfer belt unit 61 is tilted from the second position in the color mode to the third position in the black mode. At this time, the drive shaft 108 of the drive roller 62 moves around the supporting point of rotation of the transfer belt unit 61 along a circular arc locus. Since the supporting point 320 of the arm 326 in the drive apparatus 300 is movable, no trouble is generated in a drive transmission in the same manner as the case of moving upward to the second position according to a further movement of the supporting point 320 of the arm.

As mentioned above, according to the present invention, the transfer mechanism employing the transfer belt 66 is made a unit so as to be freely attached and detached and replaced with respect to the apparatus main body 1. Accordingly, it is possible to control the service life of the transfer belt 66, the transfer roller 68 and the cleaning apparatus 111, and it is possible to maintain an image having a high quality and a high precise till the service life of the image forming apparatus main body.

Further, according to the present invention, since parts such as the transfer belt 66, the transfer roller 68 and the like are made a unit and can be integrally replaced, a time required for replacing the parts can be significantly reduced. In the case of not being made a unit, some minutes or some tens minutes are required for replacing the parts, however, due to the unification of the parts, it is possible to replace by only descending the lify-up mechanism 120 and taking out the table unit 91.

Further, according to the present invention, since the transfer belt 66 is made a unit, the drive mechanism for the transfer belt 66 is arranged in the side of the apparatus main body 1. Accordingly, it is possible to simplify the structure of the transfer belt unit 61. Further, correspondingly, the drive portion in the side of the apparatus main body 1 and the drive roller 62 of the transfer belt unit 61 are connected via the spline. Accordingly, it is possible to securely transmit the drive force without the drive connecting portion 329 connecting the both being slipped, and it is possible to prevent a poor image due to the drive jitter. Further, since the drive connecting portion 329 is made movable so as to follow the lift-up mechanism 120 for moving the transfer belt unit 61 in a vertical direction, it is possible to realize the drive force transmitting mechanism with applying no load to the drive roller 62.

Further, since the cleaning apparatus 111 for cleaning the toner transferred on the transfer belt 66 is mounted to the belt frames 101 and 105 mounting the drive roller 62, it is possible to increase a positional accuracy of the cleaning apparatus 111 with respect to the drive roller 62, so that it is possible to control the service life of the cleaning apparatus 111 as well as the service life of the transfer belt unit 61.

Further, according to the present invention, since there is provided the new/old detecting mechanism 180 for controlling the service life of the transfer belt unit 61, it is possible to always maintain an image having a high quality and a high precise in the image forming apparatus. Further, since the new/old detecting mechanism 180 is arranged substantially at a center of the contact portion between the lift-up mechanism 120 and the transfer belt unit 61, it is possible to uniformly disperse the force to a plurality of link portions 120*a* in the lift-up mechanism 120 and it is possible to reduce an influence from the process unit 51 as much as possible.

Further, according to the present invention, since the peeling pawl 115 and the paper guide sheet metal 118*c* which correspond to the replaceable parts are mounted to the side of the apparatus main body 1, it is possible to reduce a cost for operating the apparatus. Further, according to the present invention, there is provided the retracting mechanism for retracting the peeling pawl 115 from the moving path of the transfer belt unit 61 when attaching and detaching the transfer belt unit 61 with respect to the table unit 91. Since this retracting mechanism is provided, it is possible to prevent the front end of the peeling pawl 115 and the transfer belt 66 from being brought into contact with each other at a time of attaching and detaching the transfer belt unit 61, so that it is possible to prevent the peeling pawl 115 and the transfer belt 66 from being damaged. Further, since the retracting mechanism for retracting the peeling pawl 115 operates by driving a part of the transfer belt unit 61, it is possible to retract the peeling pawl 115 at a suitable timing by an involuntary operation of the user or the servicing operator for attaching and detaching the transfer belt unit 61.

Further, according to the present invention, when rotating the handle 205 for lifting up in the lift-up mechanism 120 for lifting up the transfer belt unit 61, the shaft 208 and the cam

125 rotate in an interlinking manner, the lock member 124 for connecting the link portion 120*a* and the cam 125 moves over the shaft 208, and the front end of the lock member 124 is positioned near the horizontal line passing through the center of the shaft 208. Accordingly, the conventional lock mechanism is not required, and there is generated a state that the lock is naturally operated to the direction to which the force is applied. Further, by utilizing the cam 125, in comparison with the case of employing the conventional link, it is possible to freely change a distribution of the force at a rotating time according to a shape of the cam 125 as well as a loss of the force is reduced and the force of rotation of the handle 205 is directly transmitted to the cam 125.

In this case, the present invention is not limited to the embodiments mentioned above, and can be variously modified within a scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A detachable mechanism for a transfer belt unit which is provided in a side of a main body of an image forming apparatus for detachably mounting the transfer belt unit to a predetermined position within the main body, said transfer belt unit integrally having first and second rollers apart from each other, a transfer belt wound around the first and second rollers and tensioned so as to run in an endless manner, a transfer roller provided inside the transfer belt and a pair of frames rotatably supporting both ends of the first and second rollers;

said detachable mechanism comprising:

a drive mechanism connected to the first roller when mounting the transfer belt unit within the main body so as to rotate the first roller; and a lift-up mechanism for lifting up the pair of frames of the transfer belt unit inserted into the main body and connected to the drive mechanism so as to set the transfer belt unit to the predetermined position.

2. A detachable mechanism according to claim 1, wherein the lift-up mechanism has a handle for operating the lift-up mechanism, a rotary shaft provided at a center of rotation of the handle and lock mechanisms moving over the rotary shaft so as to be fixed, and the lock mechanisms fix the pair of frames lifted up by the lift-up mechanism to the predetermined position.

3. A detachable mechanism according to claim 1, wherein the drive mechanism has a connecting portion to the first roller, which follows the transfer belt unit lifted up by the lift-up mechanism.

4. A detachable mechanism according to claim 1, wherein there are further provided a peeling pawl which is brought into contact with a surface of the transfer belt in a state of setting the transfer belt unit to the predetermined position by the lift-up mechanism, and a retracting mechanism for retracting the peeling pawl from a moving path of the transfer belt unit when attaching and detaching the transfer belt unit with respect to the main body.

* * * * *